(12) United States Patent
Ong et al.

(10) Patent No.: US 9,383,611 B1
(45) Date of Patent: Jul. 5, 2016

(54) LIQUID CRYSTAL DISPLAYS HAVING PIXELS WITH A CONTROL ELECTRODE TO AMPLIFY INTRINSIC FRINGE FIELDS

(71) Applicants: Hiap L. Ong, Warren, NJ (US); Juishu Chou, Taipei (TW)

(72) Inventors: Hiap L. Ong, Warren, NJ (US); Juishu Chou, Taipei (TW)

(73) Assignees: Hiap L. Ong (TW); Kyoritsu Optronics, Co., Ltd. (TW)

( * ) Notice: Subject to any disclaimer, the term of this patent is extended or adjusted under 35 U.S.C. 154(b) by 0 days.

(21) Appl. No.: 14/590,973

(22) Filed: Jan. 6, 2015

(51) Int. Cl.
*G02F 1/1343* (2006.01)
*G02F 1/1368* (2006.01)

(52) U.S. Cl.
CPC ........ *G02F 1/134309* (2013.01); *G02F 1/1368* (2013.01); *G02F 1/134363* (2013.01); *G02F 2001/134372* (2013.01); *G02F 2001/134381* (2013.01)

(58) Field of Classification Search
CPC ........ G02F 2001/134363; G02F 2001/134381; G02F 2001/134372
See application file for complete search history.

(56) References Cited

U.S. PATENT DOCUMENTS 8,873,008 B2 * 10/2014 Yamamoto ........ G02F 1/134309
349/141

* cited by examiner

*Primary Examiner* — Phu Vu
(74) *Attorney, Agent, or Firm* — Silicon Valley Patent Group, LLC; Edward S. Mao

(57) ABSTRACT

A vertically aligned liquid crystal display is disclosed. The liquid crystal display, which has a first substrate and a second substrate, uses pixels having a pixel electrode on the first substrate, a common electrode under the second substrate, liquid crystals between the pixel electrode and the common electrode, a switching element coupled to the pixel electrode, a control electrode above the first substrate on a first side of the pixel electrode. When the pixel is in an ON state, the control electrode is at an active control voltage, which is greater than the output voltage of the first switching element. The difference in voltage in the control electrode and the pixel electrode amplifies an intrinsic fringe field around the pixel electrode. The amplified intrinsic fringe field interacts with the pixel electrode electric field and causes the liquid crystals to tilt in the same direction.

22 Claims, 17 Drawing Sheets

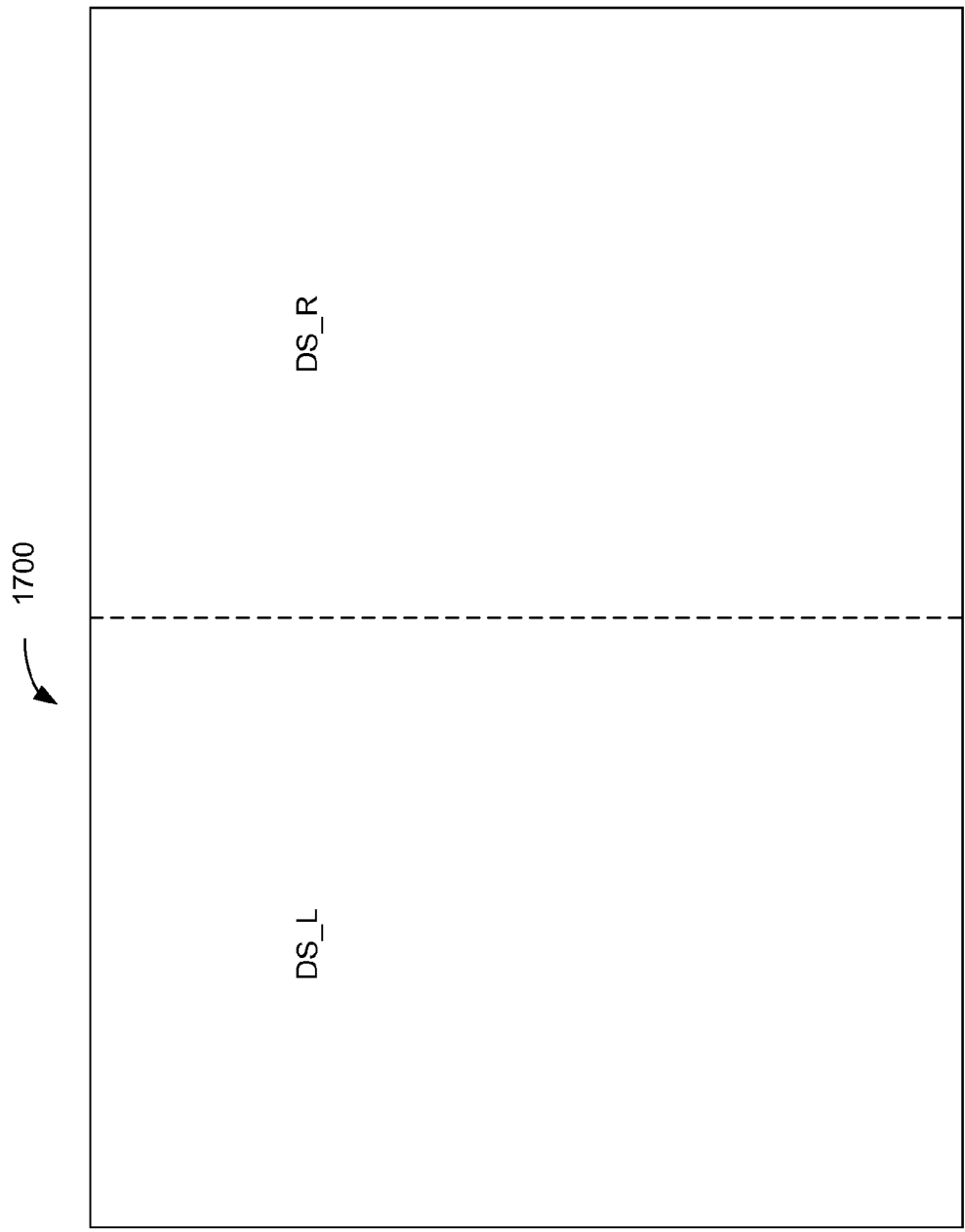

LIQUID CRYSTAL DISPLAYS HAVING PIXELS WITH A CONTROL ELECTRODE TO AMPLIFY INTRINSIC FRINGE FIELDS

BACKGROUND OF THE INVENTION

1. Field of the Invention

The present invention relates to liquid crystal displays (LCDs). More specifically, the present invention relates to vertical alignment LCDs, with very high contrast ratios.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays. Vertical alignment nematic LCDs address some of the drawbacks of conventional twisted nematic LCDs, such as low contrast ratio.

FIGS. 1A-1B illustrate the basic functionality of a pixel of a vertical alignment LCD 100. For clarity, the LCD of FIGS. 1A and 1B uses only a single domain. Furthermore, FIGS. 1A-1B are simplified for clarity and omit many processing layers. For example, between substrate 110 and electrode 120, actual displays would likely include various metal layers used for electrical connections as well as passivation layers (i.e. insulating layers) that separate the metal layers. In addition the LCD of FIGS. 1A-1B is described in terms of gray scale operation. Well known, conventional color techniques such as the use of color filters or field sequential coloring can be used to add colors.

For further clarity and consistency, the various components of the pixels and the displays in the figures are described from the perspective of the display being flat on a table and the reader being in front of the table. The perspective of the written description does not change whether the figures shows a slice of the display from the edge of the display such as FIGS. 1A and 1B or when an overhead view of a pixel or display is shown such as FIGS. 2. Thus, for figure with a view from the edge of the display, the two axes shown would be up/down axis and left/right axis. Suitable terms that are used to describe position relative to the up/down axis include "above", "below", "on top off", and "underneath". For the left/right axis suitable terms include "to the left of" and "to the right of". For Figures with an overhead view, the two axes used are the left/right axis and front/back axis. The front/back would be like a north/south axis for a map on the table. Suitable terms that are used to describe placement relative to the front/back axis include "in front of" (which would be equivalent of to being "south of" on a map) and "in back of" (which would be equivalent to being "north of" on a map). Furthermore, as used herein the up/down axis is the vertical axis, the left/right axis is the horizontal dimension, and the front/back axis is the longitudinal axis.

LCD 100 has a first polarizer 105, a first substrate 110, a first electrode 120, a first liquid crystal alignment layer 125, liquid crystals 130, a second liquid crystal alignment layer 140, a second electrode 145, a second substrate 150, and a second polarizer 155. Specifically, polarizer 105 is attached to the bottom of substrate 110, first electrode 120 is formed on top of substrate 110, and first liquid crystal alignment layer 125 is formed over first electrode 120. Liquid crystals 130 are in between first liquid crystal alignment layer 125 and second liquid crystal alignment layer 140. Common electrode 145 is above liquid crystal alignment layer 140. Common electrode 145 is formed on the bottom of second substrate 150 and second polarizer 155 is attached to the top of substrate 150. Generally, first substrate 110 and second substrate 150 are made of a transparent glass. First electrode 120 and second electrode 145 are made of a transparent conductive material such as ITO (Indium Tin Oxide). First liquid crystal alignment layer 125 and second liquid crystal alignment layer 140, which are typically made of a polyimide (PI) layer, align liquid crystals 130 near a vertical resting state, thus liquid crystals 130 have a small pre-tilt angle from the vertical alignment. In operation, a light source (not shown) sends light from below first polarizer 105, which is attached to the bottom of first substrate 110. First polarizer 105 is generally oriented with polarization axis in a first direction and second polarizer 155, which is attached to the top of second substrate 150, is oriented with polarization axis that is perpendicular to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 5 million liquid crystal molecules in a pixel that is 80 μm width by 240 μm length by 3 μm height. Although not shown, many liquid crystal displays (particularly active matrix LCDs) include a passivation layer on bottom of first electrode 120. The passivation layer serves as an insulating layer between the first electrode 120 and devices and conductors that may be formed on the substrate 110. The passivation layer is commonly formed using silicon nitrides.

In FIG. 1A, liquid crystals 130 are vertically aligned with a pre-tilt angle. In the vertical alignment, liquid crystals 130 would not rotate light polarization from the light source. Thus, light from the light source would not pass through LCD 100 and gives a completely optical black state and a very high contrast ratio for all color and all cell gap. However due to the need of a pre-tilt angle (as explained below) there is some light leakage even when a dark pixel is desired. Thus, while conventional vertically aligned LCDs provide a big improvement on the contrast ratio over the conventional low contrast twisted nematic LCDs, even higher contrast ratios are desired for advanced LCD applications.

However, as illustrated in FIG. 1B, when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue).

As illustrated in FIG. 1B, for all the liquid crystals tilt in the same direction. Having all liquid crystals in a single domain tilt in the same direction increases the brightness of a display and therefore increases the contrast ratio. In conventional vertically aligned LCDs, the pre-tilt angle makes the liquid crystals tilt in the same direction. However, the pre-tilt angle also allows light to pass through the LCD even when the pixel is turned off. Typically, the liquid crystal alignment layers are made using a well-known rubbing technique. This rubbing technique is relatively expensive and does not allow fine control on the pre-tilt. Furthermore, the rubbing technique complicates the fabrication of advanced LCDs with a complex multi-domain structure, because the liquid crystal alignment layer over each separate domain has to be rubbed in a different direction. Hence there is a need for a method or system to improve the contrast ratio and reduce the cost of vertically aligned LCDs.

SUMMARY

Accordingly, the present invention provides a vertically aligned liquid crystal displays with higher contrast ratios than conventional vertically aligned liquid crystal displays. Furthermore, the present invention can produce advanced LCDs with a complex multi-domain structure at a lower cost than conventional vertically aligned liquid crystal displays. The present invention uses amplified intrinsic fringe fields to control the direction of the tilting liquid crystals.

Specifically, in some embodiment of the present invention, a liquid crystal display, which has a first substrate and a second substrate, uses pixels having a pixel electrode on the first substrate, a common electrode under the second substrate, liquid crystals between the pixel electrode and the common electrode, a switching element coupled to the pixel electrode, a control electrode above the first substrate on a first side of the pixel electrode. When the pixel is in an ON state, the control electrode is at an active control voltage, which is greater than the output voltage of the first switching element. The difference in voltage in the control electrode and the pixel electrode amplifies an intrinsic fringe field around the pixel electrode. The amplified intrinsic fringe field interacts with the pixel electrode electric field and causes the liquid crystals to tilt in the same direction.

Furthermore, in some embodiments of the present invention, the pixel includes a base electrode above the first substrate. The pixel electrode is between the base electrode and the control electrode. The base electrode and the common electrode are coupled to a common voltage.

In some embodiments of the present invention, a liquid crystal display, which has a first substrate and a second substrate, uses pixels having vertical riser above the first substrate, a pixel electrode having a large gap region on the first substrate and a sidewall region over a sidewall of the vertical riser, a common electrode below the second substrate, liquid crystals between the pixel electrode and the common electrode, and a switching element coupled to the pixel electrode. A large gap distance between the large gap region of the pixel electrode and the common electrode is at least one and a fifth times as long as a sidewall gap distance between the sidewall region of the pixel electrode and the common electrode. The elevation of the sidewall region of the pixel electrode amplifies an intrinsic fringe field around the pixel electrode. The amplified intrinsic fringe field interacts with the pixel electrode electric field and causes the liquid crystals to tilt in the same direction.

Furthermore, in some embodiments of the present invention, the pixel electrode includes a small gap region which is located above the top of the vertical riser. For these embodiments the small gap distance is measured from the small gap region of the pixel electrode to the common electrode. The elevation of the small gap region of the pixel electrode further amplifies an intrinsic fringe field around the pixel electrode.

In some embodiments of the present invention segmented pixel electrodes are used in place of rectangular pixel electrodes. The segmented pixel electrodes include multiple pixel electrode segments extending in a first direction. A transverse pixel electrode segment extending in a second direction connects the pixel electrode segments extending in the first direction.

The present invention will be more fully understood in view of the following description and drawings.

BRIEF DESCRIPTION OF THE DRAWINGS

FIG. 17 illustrates a multi-sector display in accordance with one embodiment of the present invention.

DETAILED DESCRIPTION

As explained above, conventional vertically aligned LCDs have limited contrast ratios and advanced vertically aligned LCDs with a complex multi-domain structure are expensive to manufacture. However, vertically aligned LCDs in accordance with the principles of the present invention use amplify intrinsic fringe field to control tilting of the liquid crystals. Thus, LCDs in accordance with embodiments of the present invention have higher contrast ratios and advanced vertically aligned LCDs with a complex multi-domain structure can be manufactured less expensively as compared to conventional liquid crystal displays.

Figure 1A:
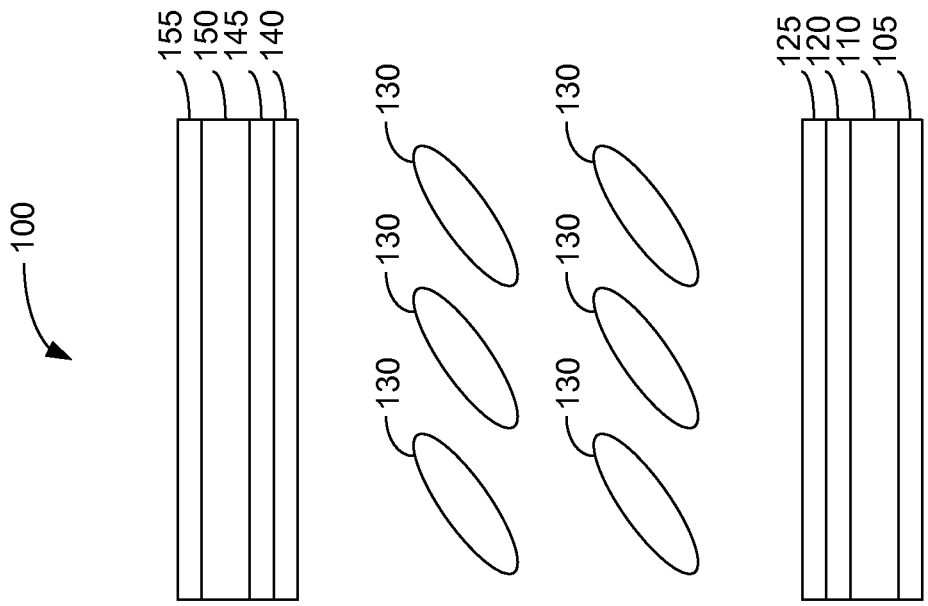
FIGS. 1A-1B illustrate a pixel of a conventional single domain vertical alignment LCD.
Figure 1B:
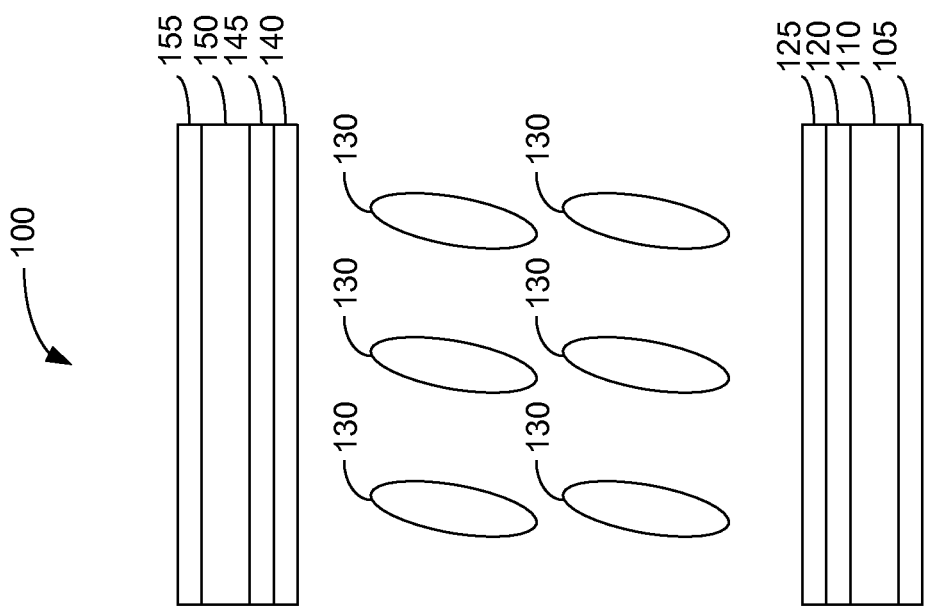
Figure 2:
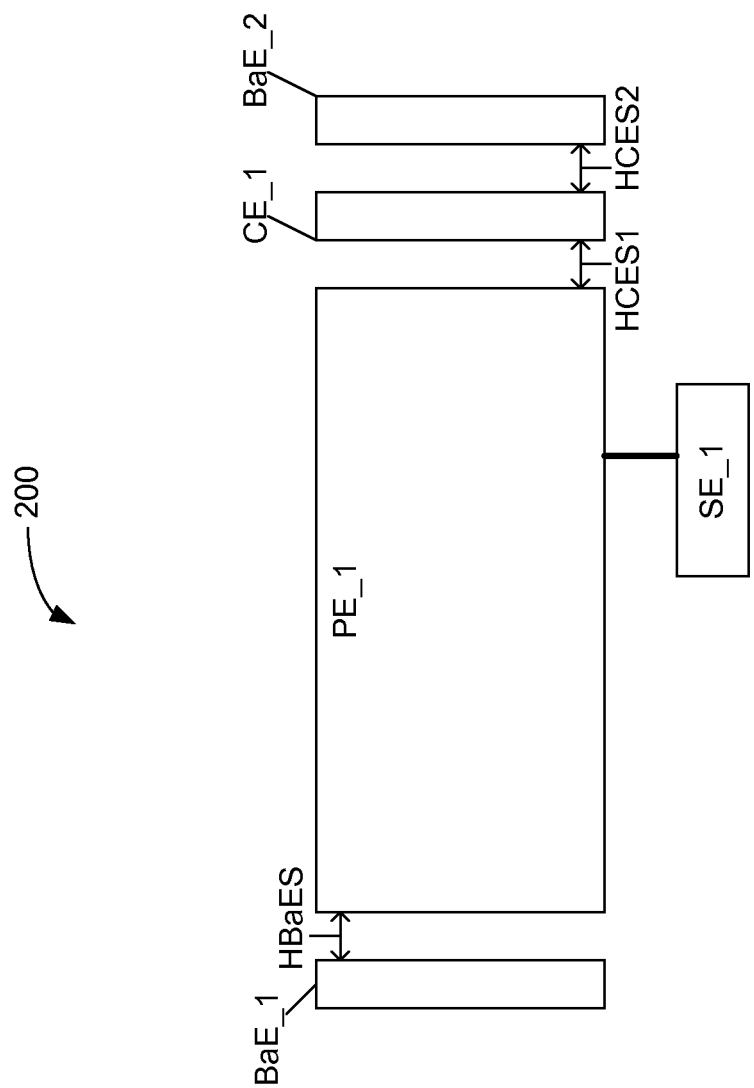
FIG. 2 illustrates a pixel of a liquid crystal display in accordance with one embodiment of the present invention.

FIG. 2 shows a pixel 200 in accordance with one embodiment of the present invention. Pixel 200 includes a first base electrode BaE_1, a second base electrode BaE_2, a pixel electrode PE_1, a control electrode CE_1, and a switching element SE_1, which could be for example a thin-film transistor (TFT). Pixel electrode PE_1 is located between first base electrode BaE_1 and control electrode CE_1. Specifically, base electrode BaE_1 is on a first side (i.e. the left side in FIG. 2) of pixel electrode PE_1 and separated from pixel electrode PE_1, by a horizontal base electrode separation HBaES. Control electrode CE_1 is on a second, or opposite side (i.e. the right side in FIG. 2) of pixel electrode PE_1 and separated from pixel electrode PE_1 by a horizontal control electrode separation HCES1. Base electrode BaE_2 is on the opposite side of control electrode CE_1 as compared to pixel electrode PE_1 and is separated from control electrode CE_1 by a horizontal control electrode separation HCES2. Thus, control electrode CE_1 is between base electrode BaE_2 and pixel electrode PE_1. Switching element SE_1 is coupled to pixel electrode SE_1 and control whether pixel 200 is configured to a pixel ON state (transmits light) or a pixel OFF state (blocks light). Specifically, switching element SE_1 drives pixel electrode PE_1 to a pixel ON voltage level V_p_on to transition pixel 200 to the pixel ON state. Conversely, switching element SE_1 drives pixel electrode PE_1 to a pixel off voltage level V_p_off to transition pixel 200 to the pixel OFF state. To better show the pixel structure, the liquid crystal alignment layer for pixel 200 is omitted in FIG. 2. Unlike conventional vertically aligned LCDs, the liquid crystal alignment layers for pixel 200 would not need to undergo the rubbing process to give the liquid crystals a pre-tilt angle. Generally, pixel electrode is formed using a transparent conductor such as indium tin oxide (ITO). Base electrodes and control electrodes can be formed using non-transparent material. However in many embodiments the same material is used for the pixel electrodes, base electrodes, and control electrodes to reduce process steps because the base electrodes, pixel electrodes, and control electrodes can be deposited and patterned in the same process steps. However, some embodiments of the present invention includes a black matrix or other non-transparent material to prevent light leakage around the control electrodes or base electrodes, which may improve the contrast ratio of the display.

Figure 3:
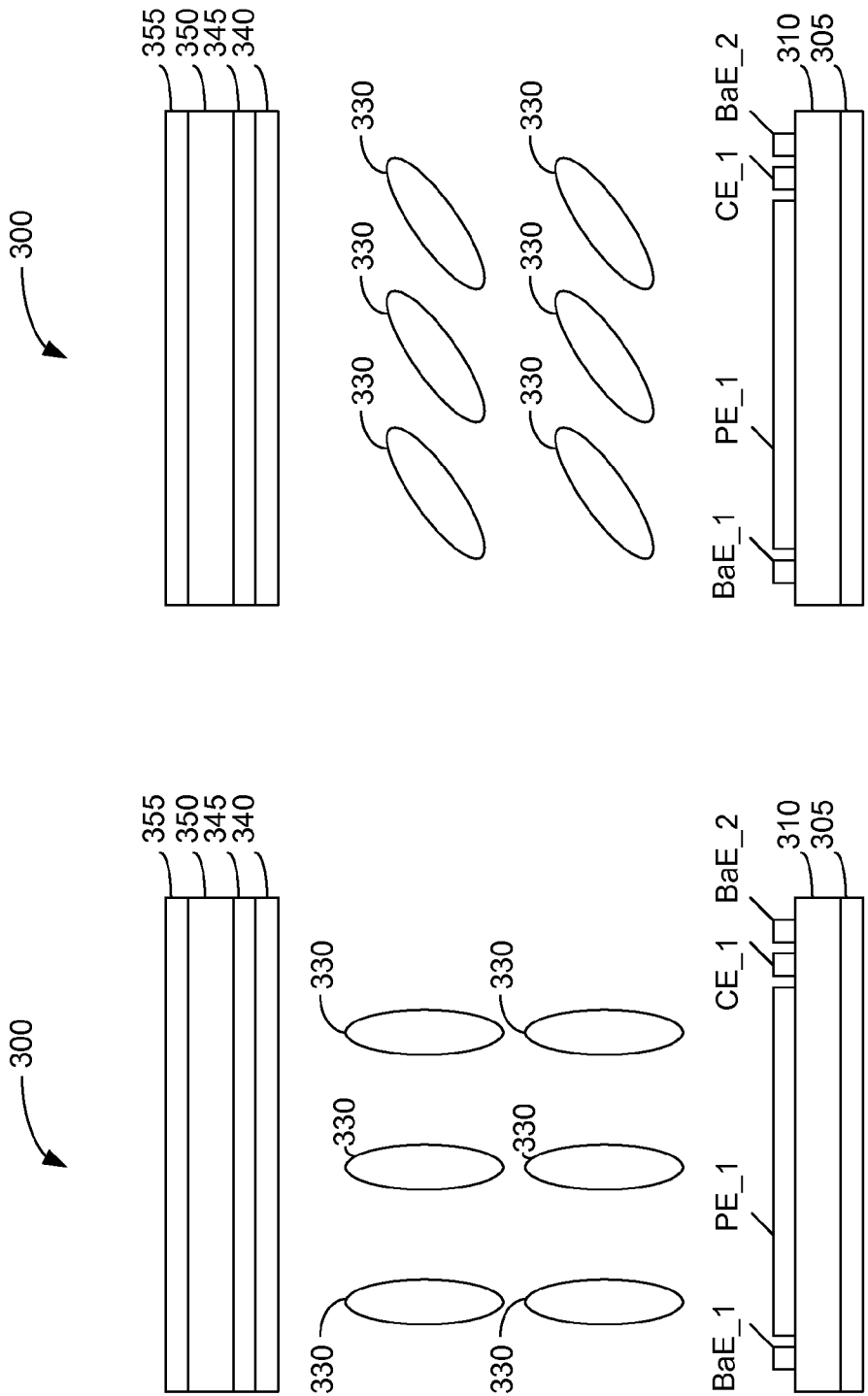
FIGS. 3A-3B illustrate a liquid crystal display in accordance with one embodiment of the present invention.

FIGS. 3A-3B show pixel 200 used in a display 300. Display 300 includes a first polarizer 305, a first substrate 310, pixel 200 (having base electrode BaE_1, base electrode BaE_2, pixel electrode PE_1, a control electrode CE_1), liquid crystals 330, liquid crystal alignment layer 340, a common electrode 345, a second substrate 350, and a second polarizer 355. Another liquid crystal alignment layer is formed over first substrate 310, base electrodes BaE_1, BaE_2, pixel electrode PE_1, and control electrode CE_1, but is omitted in FIGS. 3A and 3B to better illustrate pixel 200. Specifically, first polarizer 305 is attached to the bottom of first substrate 310. Pixel 200 is formed over first substrate 310 and arranged as described above and shown in FIG. 2. Another liquid crystal alignment layer is formed over first substrate 310, base electrodes BaE_1, BaE_2, pixel electrode PE_1, and control electrode CE_1, but is omitted in FIGS. 3A and 3B to better illustrate pixel 200. Liquid crystals 330 are above pixel electrode PE_1 and beneath liquid crystal alignment layer 340. Common electrode 345 is above liquid crystal alignment layer 340. Common electrode 145 is formed on the bottom of second substrate 350 and second polarizer 355 is attached to the top of substrate 150. Pixel electrode PE_1 is coupled to switching element SE_1 (not shown in FIGS. 3A-3B). Common electrode 345 and Base electrodes BaE_1 and BaE_2 are connected to a common voltage V_comm. Control electrode CE_1 is coupled to a control voltage signal V_ctrl. Control voltage signal V_ctrl has an active voltage V_ctrl_act and an inactive voltage V_ctrl_inact. Furthermore, some embodiments of the present invention maintain control voltage signal V_ctrl at active voltage V_ctrl_act regardless of the state of pixel 200. In other embodiments of the present invention, control voltage signal V_ctrl oscillates between active voltage V_ctrl_act and inactive voltage V_ctrl_inact depending on the state of pixel 200. Different embodiments of the present invention can have different sources of control voltage signal V_ctrl. In some embodiments a specialized high voltage driver IC (integrated circuit) is included in the display in other embodiments control voltage signal V_ctrl is taken from a gate IC. In many embodiments of the present invention, active voltage V_ctrl_act is between 12V and 20V, voltage V_comm is zero volts, and pixel ON voltage V_p_on is 5V to 6V, inactive voltage V_ctrl_inact is zero volts. In general, active voltage V_ctrl_act should be at least twice has high as pixel ON voltage V_p_on.

The difference in voltage on pixel electrode PE_1 and control electrode CE_1 amplifies an intrinsic fringe field around pixel electrode PE_1. In addition, the difference in voltage on control electrode CE_1 and base electrode BaE_1 may also amplify the intrinsic fringe field around pixel electrode PE_1. The amplified intrinsic fringe field interacts with the electric field between pixel electrode PE_1 and the common electrode, when pixel electrode PE_1 is turned on (i.e. transmit light). For clarity the electric field between the pixel electrode and the common electrode is hereinafter referred to as the pixel electrode electric field. The interaction of amplified intrinsic fringe field and the pixel electrode electric field causes the liquid crystals to tilt in the same direction. Liquid crystal effects are collective effects. Thus even though fringe fields are small, the induced liquid crystal effects could be very large due to the liquid crustal collective effects. In general, fringe fields are concentrated mostly on the edge of pixel electrode PE_1, however, large fringe field effects can be induced because of the non-local LC corrective orientation effects.

Base electrode BaE_2 serves to prevent control electrode CE_1 from amplifying the fringe field of an adjacent pixel (not shown). However because the adjacent pixel has an equivalent base electrode BaE_1, some embodiments of the present invention omit base electrode BaE_2.

In FIG. 3A, pixel 200 is in the pixel OFF state. The voltage on pixel electrode PE_1 is nearly the same as common voltage V_comm. Therefore, there is practically no electric field between common electrode 345 and pixel electrode PE_1. Accordingly, liquid crystals 330 are in the initial vertical orientation without any pre-tilt angle position. However, some embodiments of the present invention may induce a pre-tilt angle in the liquid crystals even though the pre-tilt angle would lower the contrast ratio of the display.

In FIG. 3B, pixel 200 is in the pixel ON state. Switching element SE_1 (not shown) drives pixel electrode PE_1 to an pixel on voltage V_p_on. Accordingly, a pixel electrode electric field develops between common electrode 345 (at common voltage Vcomm) and pixel electrode PE_1. The amplified intrinsic fringe field interacts with the pixel electrode electric field to cause the liquid crystals tilt in the same direction. The tilted liquid crystals allow light to pass through display 300. In displays where the liquid crystals should tilt left instead of right, the positions of the base electrodes and the control electrodes can be swapped. In some embodiments of the present invention, pixel electrode PE_1 has a width between 40-70 micrometers, and a height between 40-70 micrometers.

Figure 4:
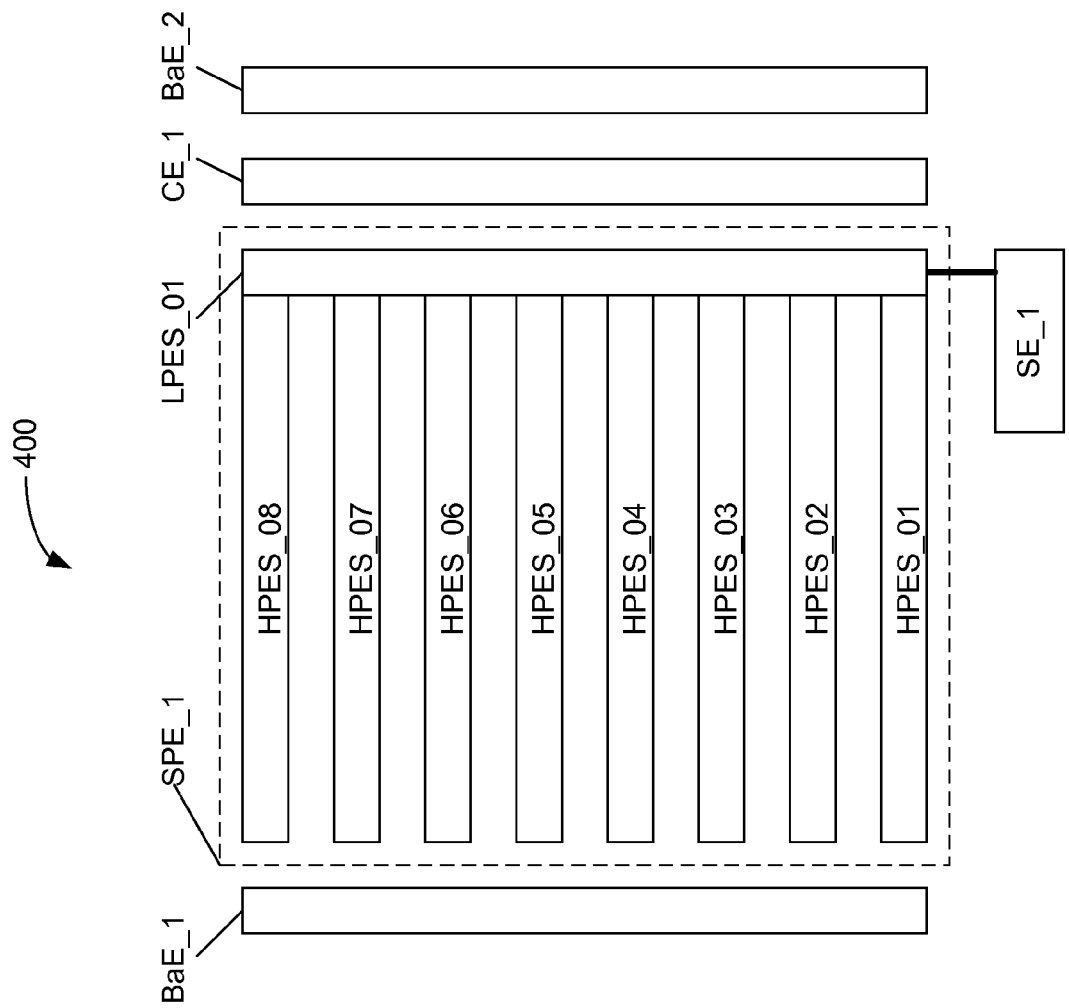
FIG. 4 illustrates a pixel of a liquid crystal display in accordance with one embodiment of the present invention.

To further enlarge and control the fringe field effects, some embodiments of the present inventions use a segmented pixel electrode rather than a solid rectangular electrode. FIG. 4 illustrates a pixel 400 using a segmented pixel electrode SPE_1. Pixel 400 also includes a first base electrode BaE_1, a second base electrode BaE_2, a control electrode CE_1, and a switching element SE_1, which could be for example a thin-film transistor (TFT). Segmented Pixel electrode SPE_1 includes a plurality of horizontal pixel electrode segments HPES_01, HPES_02, HPES_08 and a longitudinal pixel electrode segment LPES_01. In pixel 400, longitudinal pixel electrode segment LPES_01 forms the right side of segmented pixel electrode SPE_1. Horizontal pixel electrode segments HPES_01-HPES_08 extend from the left side of segmented pixel electrode SPE_1 to longitudinal pixel electrode segment LPES_01 and are separated by a longitudinal segment separation LSS (not labeled in FIG. 4). In other embodiments of the present invention, longitudinal pixel electrode segment LPES_01 can be located elsewhere. In still other embodiments of the present invention longitudinal pixel electrode segment LPES_01 can be omitted and other conductors are used to electrically couple the horizontal pixel electrode segments together.

Segmented pixel electrode SPE_1 is located between first base electrode BaE_1 and control electrode CE_1. Specifically, base electrode BaE_1 is on a first side (i.e. the left side in FIG. 4) of segmented pixel electrode SPE_1(more specifically, on the left sides of horizontal pixel electrode segments HPES_01-HPES_08) and separated from segmented pixel electrode SPE_1, by a horizontal base electrode separation HBaES (not labeled in FIG. 4). Control electrode CE_1 is on a second, or opposite side (i.e. the right side in FIG. 4) of segmented pixel electrode SPE_1 and separated from segmented pixel electrode SPE_1 by a horizontal control electrode separation HCES1 (not labeled in FIG. 4). Base electrode BaE_2 is on the opposite side of control electrode CE_1 as compared to segmented pixel electrode SPE_1 and is separated from control electrode CE_1 by a horizontal control electrode separation HCES2. Thus, control electrode CE_1 is between segmented pixel electrode SPE_1 and base electrode BaE_2. Switching element SE_1 is coupled to segmented pixel electrode SPE_1 and control whether pixel 400 is configured to the pixel ON state (transmits light) or the pixel OFF state (blocks light). Control electrode CE_1 is coupled to control voltage signal V_ctrl and base electrodes BaE_1 and BaE_2 are coupled to common voltage V_comm. Operation of pixel 400 is similar to the operation of pixel 200 as described above. However, in pixel 400 each horizontal pixel electrode segment has an intrinsic fringe field which is amplified by the differing voltages on segmented pixel electrode SPE_1 and control electrode CE_1. In addition, the difference in voltage on control electrode CE_1 and base electrode BaE_1 may also amplify the intrinsic fringe fiends. One advantage of pixel 400 is that pixel 400 can be easily modified to longer along the longitudinal axis by simply adding more horizontal pixel electrode segments and lengthening longitudinal pixel electrode segment LPES_01, base electrode BaE_1, control electrode CE_1, and base electrode BaE_2. In some embodiment of pixel 400, the width of the horizontal pixel electrode segments is 40-70 micrometers, the depth (i.e. length along longitudinal axis) of the horizontal pixel electrode segments is 4-5 micrometers, the longitudinal pixel separation is 4-5 micrometers, the width of longitudinal pixel electrode segment LPES_01 is 4-5 micrometer, the depth (i.e. length along the longitudinal axis) of longitudinal pixel electrode segment is equal the depth of segmented pixel electrode SPE_1, (which depends on the number of horizontal pixel electrode segments), the width of control electrodes CE_1 is 4 to 5 micrometers, the length of control electrode CE_1 is the same as the depth of segmented pixel electrode SPE_1, the width of base electrodes BaE_1 and BaE_2 are 4 to 5 micrometers, the depth of base electrodes BaE_1 and BaE_2 are equal to the depth of segmented pixel electrode SPE_1, horizontal base electrode separation HBaES and horizontal control electrode separator HCES1 and HCES2 are 4 to 5 micrometers. Varying embodiments of the present invention can include any number of horizontal pixel electrode segments.

Figure 5:
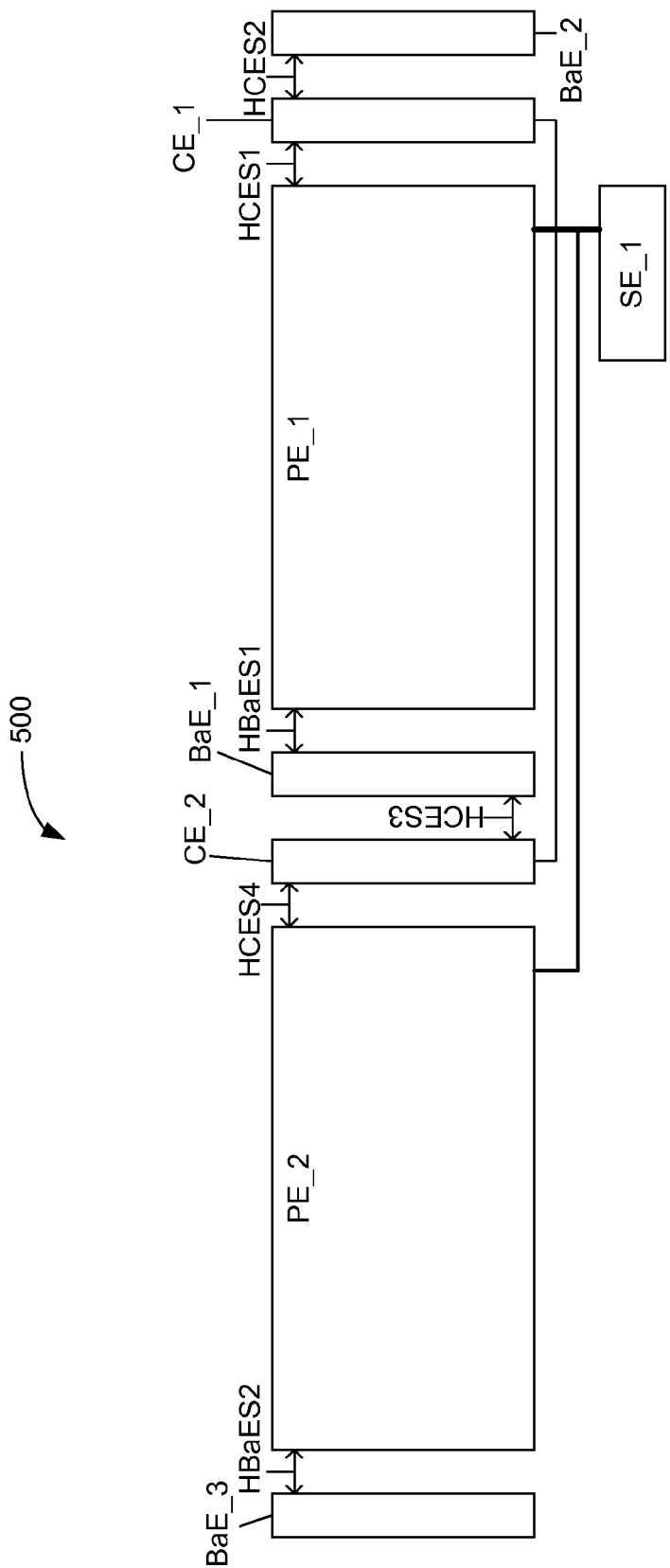
FIG. 5 illustrates a pixel of a liquid crystal display in accordance with one embodiment of the present invention.

In some displays, a wider pixel may be desired. FIG. 5 illustrates a pixel 500 that would be suitable for these displays. Pixel 500 includes a first base electrode BaE_1, a second base electrode BaE_2, a third base electrode BAE_3, a first pixel electrode PE_1, a second pixel electrode PE_2, a first control electrode CE_1, a second control electrode CE_2, and a switching element SE_1. Pixel electrode PE_1 is located between first base electrode BAE_1 and control electrode CE_1. Specifically, base electrode BaE_1 is on a first side (i.e. the left side in FIG. 5) of pixel electrode PE_1 and separated from pixel electrode PE_1, by a horizontal base electrode separation HBaES1. Control electrode CE_1 is on a second, or opposite side (i.e. the right side in FIG. 5) of pixel electrode PE_1 and separated from pixel electrode PE_1 by a horizontal control electrode separation HCES1. Base electrode BaE_2 is on the opposite side of control electrode CE_1 as compared to pixel electrode PE_1 and is separated from control electrode CE_1 by a horizontal control electrode separation HCES2. Thus, control electrode CE_1 is between base electrode BaE_2 and pixel electrode PE_1.

Control electrode CE_2 is located to the left of base electrode BaE_1, and separated from base electrode BaE_1 by a horizontal control electrode spacing HCES3. Thus, base electrode BaE_1 is between control electrode CE_2 and pixel electrode PE_1. Pixel electrode PE_2 is located between base electrode BaE_3 and control electrode CE_2. Specifically, base electrode BaE_3 is on a first side (i.e. the left side in FIG. 5) of pixel electrode PE_2 and separated from pixel electrode PE_2, by a horizontal base electrode separation HBaES2. Control electrode CE_2 is on a second, or opposite side (i.e. the right side in FIG. 5) of pixel electrode PE_2 and separated from pixel electrode PE_2 by a horizontal control electrode separation HCES4. Therefore, control electrode CE_2 is between base electrode BaE_1 and pixel electrode PE_2. In pixel 500, control electrode CE_1 is coupled to control electrode CE_2, however in other embodiments of the present invention, control electrode CE_1 and CE_2 can be coupled to different voltage sources. Switching element SE_1 is coupled to pixel electrode PE_1 and pixel electrode PE_2 and control whether pixel 500 is configured to the pixel ON state (transmits light) or the pixel OFF state (blocks light). Control electrodes CE_1 and CE_2 are coupled to control voltage signal V_ctrl and base electrodes BaE_1, BaE_2, and BaE_3 are coupled to common voltage V_comm. Thus, pixel 500 is very similar to two pixels like pixel 200 operating in parallel. Even wider pixels can be created by adding additional pixel electrodes between an additional base electrode and control electrode to the left of pixel electrode PE_2 (or to the right of pixel electrode PE_1).

Figure 6:
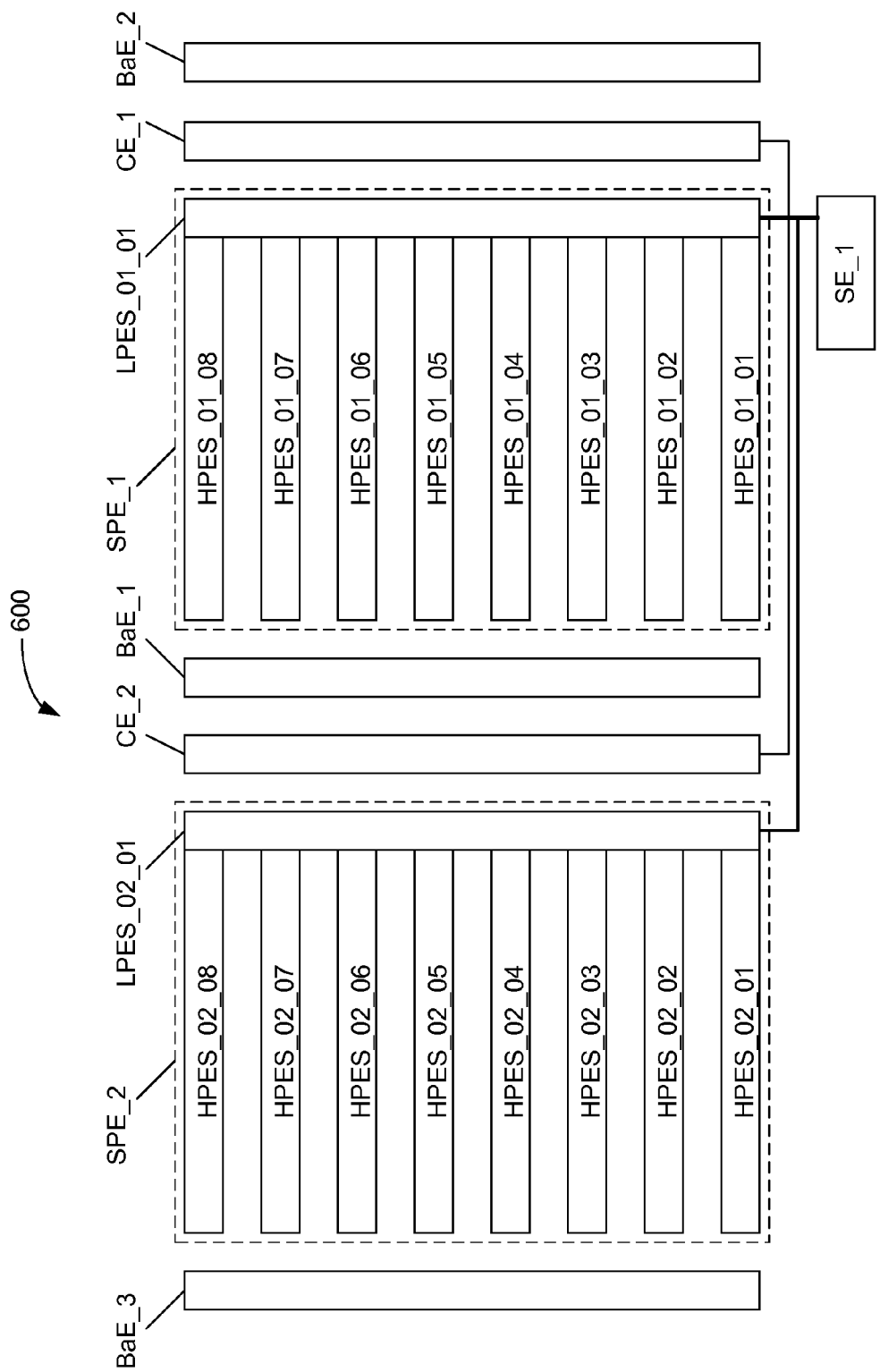
FIG. 6 illustrates a pixel of a liquid crystal display in accordance with one embodiment of the present invention.

Furthermore pixel electrodes PE_1 and PE_2 can be replaced with segmented pixel electrodes as shown in FIG. 6. FIG. 6 illustrates a pixel 600 that includes a first base electrode BaE_1, a second base electrode BaE_2, a third base electrode BAE_3, a first segmented pixel electrode SPE_1, a second segmented pixel electrode SPE_2, a first control electrode CE_1, a second control electrode CE_2, and a switching element SE_1. Segmented pixel electrode SPE_1 is located between first base electrode BAE_1 and control electrode CE_1. Specifically, base electrode BaE_1 is on a first side (i.e. the left side in FIG. 6) of segmented pixel electrode SPE_1 and separated from segmented pixel electrode SPE_1, by a horizontal base electrode separation HBaES1 (not labeled in FIG. 6). Control electrode CE_1 is on a second, or opposite side (i.e. the right side in FIG. 6) of segmented pixel electrode SPE_1 and separated from segmented pixel electrode SPE_1 by a horizontal control electrode separation HCES1 (not labeled in FIG. 6). Base electrode BaE_2 is on the opposite side of control electrode CE_1 as compared to segmented pixel electrode SPE_1 and is separated from control electrode CE_1 by a horizontal control electrode separation HCES2 (not labeled in FIG. 6). Thus, control electrode CE_1 is between base electrode BaE_2 and segmented pixel electrode SPE_1.

Control electrode CE_2 is located to the left of base electrode BaE_1, and separated from base electrode BaE_1 by a horizontal control electrode spacing HCES3. Thus, base electrode BaE_1 is between control electrode CE_2 and segmented pixel electrode SPE_1. Segmented pixel electrode SPE_2 is located between base electrode BaE_3 and control electrode CE_2. Specifically, base electrode BaE_3 is on a first side (i.e. the left side in FIG. 6) of segmented pixel electrode SPE_2 and separated from segmented pixel electrode SPE_2, by a horizontal base electrode separation HBaES2 (not labeled in FIG. 6). Control electrode CE_2 is on a second, or opposite side (i.e. the right side in FIG. 6) of segmented pixel electrode SPE_2 and separated from segmented pixel electrode SPE_2 by a horizontal control electrode separation HCES4 (not labeled in FIG. 6). Therefore, control electrode CE_2 is between base electrode BaE_1 and segmented pixel electrode SPE_2. In pixel 600, control electrode CE_1 is coupled to control electrode CE_2, however in other embodiments of the present invention, control electrode CE_1 and CE_2 can be coupled to different voltage sources. Switching element SE_1 is coupled to segmented pixel electrode SPE_1 and segmented pixel electrode SPE_2 and control whether pixel 600 is configured to the pixel ON state (transmits light) or the pixel OFF state (blocks light). Control electrodes CE_1 and CE_2 are coupled to control voltage signal V_ctrl and base electrodes BaE_1, BaE_2, and BaE_3 are coupled to common voltage V_comm.

Segmented pixel SPE_1 of pixel 600 has a plurality of horizontal pixel electrode segments HPES_01_01, HPES_01_02, . . . HPES_01_08 and a longitudinal pixel electrode segment LPES_01_01. In pixel 600, longitudinal pixel electrode segment LPES_01_01 forms the right side of segmented pixel electrode SPE_1. Horizontal pixel electrode segments HPES_01_01-HPES_01_08 extend from the left side of segmented pixel electrode SPE_1 to longitudinal pixel electrode segment LPES_01_01. Similarly, segmented pixel SPE_2 of pixel 600 has a plurality of horizontal pixel electrode segments HPES_02_01, HPES_02_02, . . . HPES_02_08 and a longitudinal pixel electrode segment LPES_02_01. In pixel 600, longitudinal pixel electrode segment LPES_02_01 forms the right side of segmented pixel electrode SPE_2. Horizontal pixel electrode segments HPES_02_01-HPES_02_08 extend from the left side of segmented pixel electrode SPE_2 to longitudinal pixel electrode segment LPES_02_01. Pixel 600 can be made deeper (i.e. longer along the longitudinal axis) by including more horizontal pixel electrode segments in segmented pixels SPE_1 and SPE_2. In addition Pixel 600 can be made wider by including an additional segmented pixel electrodes sandwiched between additional base electrodes and control electrodes.

Figure 7:
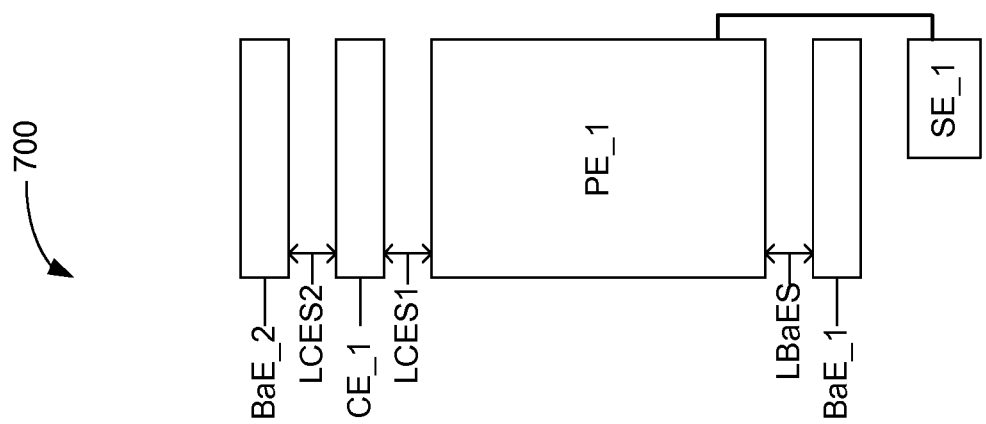
FIG. 7 illustrates a pixel of a liquid crystal display in accordance with one embodiment of the present invention.

In Pixels 200, 400, 500, and 600, the liquid crystals tilt to the right (or left when the base electrodes and control electrodes are swapped). However, for some applications having the liquid crystals tilt towards or away from (relative to a display flat on a table in front of the user) would be preferable. FIG. 7 shows a pixel 700 in which the liquid crystals would tilt away when the pixel is turned on. Pixel 700 includes a first base electrode BaE_1, a second base electrode BaE_2, a pixel electrode PE_1, a control electrode CE_1, and a switching element SE_1. Pixel electrode PE_1 is located between first base electrode BAE_1 and control electrode CE_1. Specifically, base electrode BaE_1 is on a first side (i.e. the front side in FIG. 7) of pixel electrode PE_1 and separated from pixel electrode PE_1, by a longitudinal base electrode separation LBaES. Control electrode CE_1 is on a second, or opposite side (i.e. the back side in FIG. 7) of pixel electrode PE_1 and separated from pixel electrode PE_1 by a longitudinal control electrode separation LCES1. Base electrode BaE_2 is on the opposite side of control electrode CE_1 as compared to pixel electrode PE_1 and is separated from control electrode CE_1 by a longitudinal control electrode separation LCES2. Switching element SE_1 is coupled to pixel electrode SE_1 and control whether pixel 700 is configured to the pixel ON state (transmits light) or the pixel OFF state (blocks light). Because pixel 700 is basically pixel 200 rotated by 90 degrees, the operation of pixel 700 is very similar to the operation of pixel 200 as described above.

Figure 8:
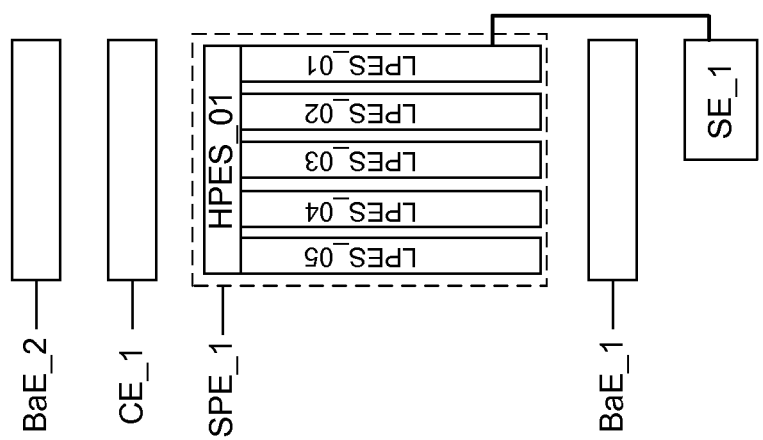
FIG. 8 illustrates a pixel of a liquid crystal display in accordance with one embodiment of the present invention.

FIG. 8 illustrates a pixel 800 using a segmented pixel electrode SPE_1. Pixel 800 also includes a first base electrode BaE_1, a second base electrode BaE_2, a control electrode CE_1, and a switching element SE_1. Segmented Pixel electrode SPE_1 includes a plurality of longitudinal pixel electrode segments LPES_01, LPES_02, . . . LPES_05 and a horizontal pixel electrode segment HPES_01. In pixel 800, horizontal pixel electrode segment HPES_01 forms the back side of segmented pixel electrode SPE_1. Longitudinal pixel electrode segments LPES_01-LPES_05 extend from the front side of segmented pixel electrode SPE_1 to horizontal pixel electrode segment HPES_01. In other embodiments of the present invention, horizontal pixel electrode segment HPES_01 can be located elsewhere. In still other embodiments of the present invention horizontal pixel electrode segment HPES_01 can be omitted and other conductors are used to electrically couple the longitudinal pixel electrode segments together.

Segmented pixel electrode SPE_1 is located between first base electrode BAE_1 and control electrode CE_1. Specifically, base electrode BaE_1 is on a first side (i.e. the front side in FIG. 8) of segmented pixel electrode SPE_1 (more specifically, on the front sides of longitudinal pixel electrode segments LPES_01-LPES_05) and separated from segmented pixel electrode SPE_1, by a longitudinal base electrode separation LBaES (not labeled in FIG. 8). Control electrode CE_1 is on a second, or opposite side (i.e. the back side in FIG. 8) of segmented pixel electrode SPE_1 and separated from segmented pixel electrode SPE_1 by a longitudinal control electrode separation LCES1 (not labeled in FIG. 8). Base electrode BaE_2 is on the opposite side of control electrode CE_1 as compared to segmented pixel electrode SPE_1 and is separated from control electrode CE_1 by a longitudinal control electrode separation LCES2 (not labeled in FIG. 8). Switching element SE_1 is coupled to segmented pixel electrode SPE_1 and control whether pixel 800 is configured to the pixel ON state (transmits light) or the pixel OFF state (blocks light). Operation of pixel 800 is similar to the operation of pixel 700 as described above. However, in pixel 800 each longitudinal pixel electrode segment has an intrinsic fringe field which is amplified by the differing voltages on longitudinal pixel electrode segments (LPES_01-LPES_05) and control electrode CE_1. One advantage of pixel 800 is that pixel 800 can be easily modified to be wider by simply adding more longitudinal pixel electrode segments and lengthening horizontal pixel electrode segment HPES_01, base electrode BaE_1, control electrode CE_1, and base electrode BaE_2. In some embodiment of pixel 800, the depth (i.e. length along the longitudinal axis) of the longitudinal pixel electrode segments is 40 to 70 micrometers, the width of the longitudinal pixel electrode segments is 4 micrometers to 5 micrometers, the horizontal pixel segment separation is 4-5 micrometers, the depth of horizontal pixel electrode segment HPES_01 is 4 to 5 micrometer, the width of horizontal pixel electrode segment is equal the width of segmented pixel electrode SPE_1, (which depends on the number of longitudinal pixel electrode segments), the depth of control electrodes CE_1 is 4 to 5 micrometers, the width of control electrode CE_1 is the same has the width of segmented pixel electrode SPE_1, the depth of base electrodes BaE_1 and BaE_2 are 4 to 5 micrometers, the width of base electrodes BaE_1 and BaE_2 are equal to the width of segmented pixel electrode SPE_1, longitudinal base electrode separation LBaES and longitudinal control electrode separator LCES1 and LCES2 are 4 to 5 micrometers. Varying embodiments of the present invention can include any number of longitudinal pixel electrode segments.

Figure 9:
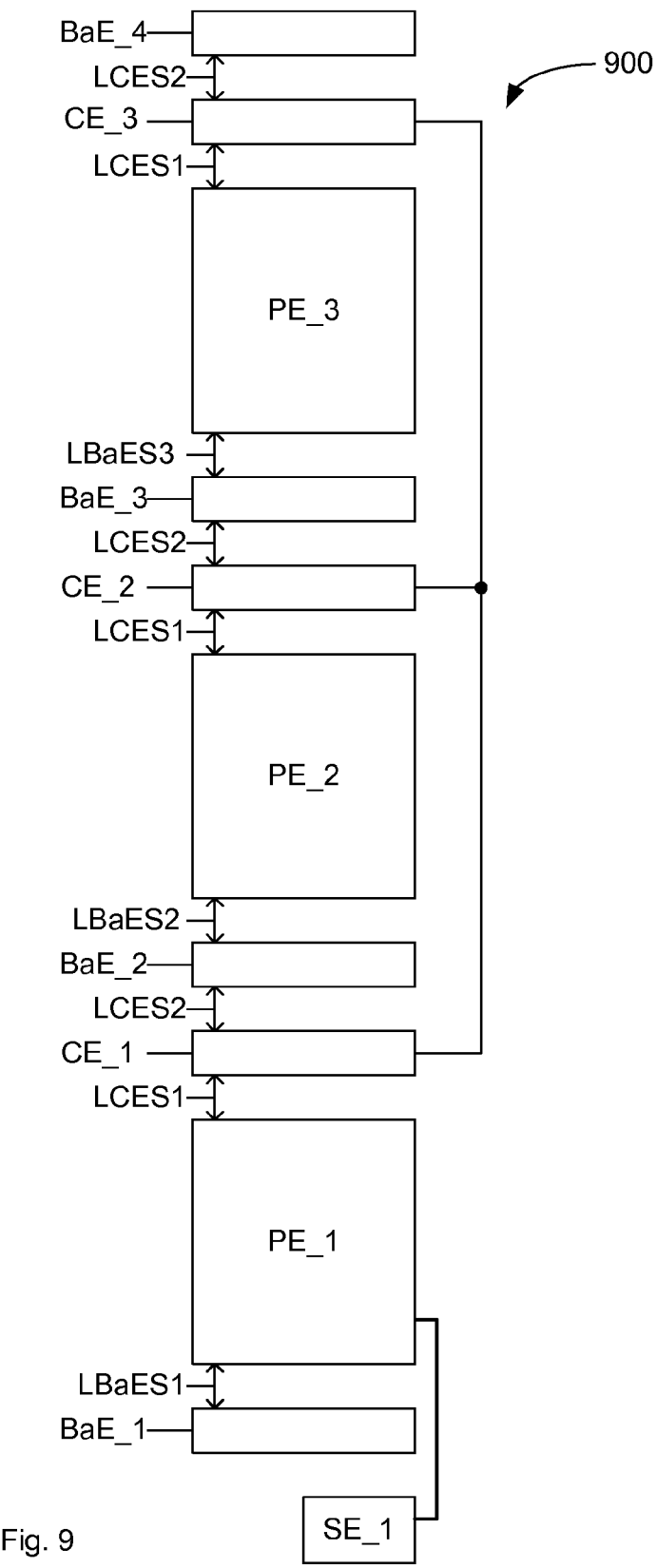
FIG. 9 illustrates a pixel of a liquid crystal display in accordance with one embodiment of the present invention.

For deeper (i.e. longer along the longitudinal axis) pixels additional pixels electrodes can be added to pixel 800. FIG. 9 illustrates a pixel 900 that includes three pixel electrodes PE_1, PE_2, and PE_3. Pixel 900 also includes four base electrodes BaE_1, BaE_2, BAE_3, and BaE4, three control electrode CE_1, CE_2, and CE_3, and a switching element SE_1. Pixel electrode PE_1 is located between base electrode BAE_1 and control electrode CE_1. Specifically, base electrode BaE_1 is on a first side (i.e. the front side in FIG. 7) of pixel electrode PE_1 and separated from pixel electrode PE_1, by a longitudinal base electrode separation LBaES. Control electrode CE_1 is on a second, or opposite side (i.e. the back side in FIG. 9) of pixel electrode PE_1 and separated from pixel electrode PE_1 by a longitudinal control electrode separation LCES1. Base electrode BaE_2 is on the opposite side of control electrode CE_1 as compared to pixel electrode PE_1 and is separated from control electrode CE_1 by a longitudinal control electrode separation LCES2. Pixel electrode PE_2 is located between base electrode BaE_2 and control electrode CE_2. Specifically, base electrode BaE_2 is on a first side (i.e. the front side in FIG. 9) of pixel electrode PE_2 and separated from pixel electrode PE_1, by a longitudinal base electrode separation LBaES. Control electrode CE_2 is on a second, or opposite side (i.e. the back side in FIG. 9) of pixel electrode PE_2 and separated from pixel electrode PE_2 by a longitudinal control electrode separation LCES1. Base electrode BaE_3 is on the opposite side of control electrode CE_2 as compared to pixel electrode PE_2 and is separated from control electrode CE_2 by a longitudinal control electrode separation LCES2. Pixel electrode PE_3 is located between base electrode BaE_3 and control electrode CE_3. Specifically, base electrode BaE_3 is on a first side (i.e. the front side in FIG. 9) of pixel electrode PE_3 and separated from pixel electrode PE_1, by a longitudinal base electrode separation LBaES. Control electrode CE_3 is on a second, or opposite side (i.e. the back side in FIG. 9) of pixel electrode PE_3 and separated from pixel electrode PE_3 by a longitudinal control electrode separation LCES1. Base electrode BaE_3 is on the opposite side of control electrode CE_3 as compared to pixel electrode PE_3 and is separated from control electrode CE_3 by a longitudinal control electrode separation LCES2. In pixel 900, control electrode CE_1 is coupled to control electrode CE_2 and control electrode CE_3, however in other embodiments of the present invention, control electrode CE_1, CE_2 and CE_3 can be coupled to different voltage sources. Switching element SE_1 is coupled to pixel electrodes PE_1, PE_2, and PE_3. Pixel 900 is very similar to three pixels like pixel 700 operating in parallel. Even deeper (i.e. longer along the longitudinal axis) pixels can be created by adding additional pixel electrodes between an additional base electrode and control electrode. Furthermore, pixel 900 can be modified to include segmented pixel electrodes in place of rectangular pixel electrodes in the same manner as pixel 700 was modified into pixel 800 by replacing a rectangular pixel electrode with a segmented pixel electrode.

Figure 10:
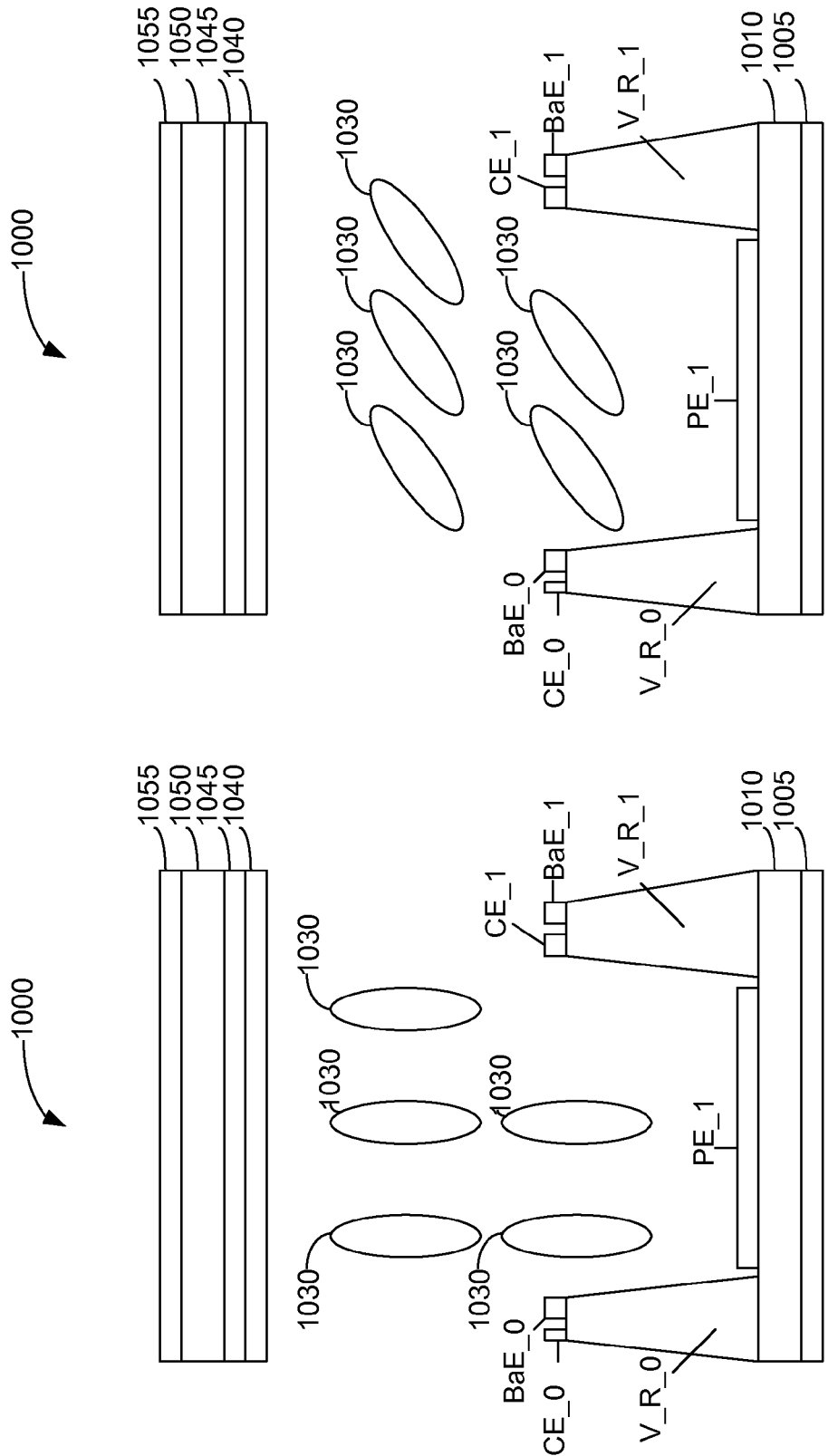
FIGS. 10A-10B illustrate a liquid crystal display in accordance with one embodiment of the present invention.

FIGS. 10A-10B show a pixel 1000P (not specifically labeled in FIGS. 10A-10B) used in a display 1000. Display 1000 includes a first polarizer 1005, a first substrate 1010, pixel 1000P_1 (having base electrode BaE_1, pixel electrode PE_1, a control electrode CE_1, and a vertical riser V_R_1), a portion of a pixel to the left of pixel 1000P (having vertical riser V_R_0, control electrode CE_0 on top of vertical riser V_R_0, and base electrode BaE_0, also on top of vertical riser V_R_0), liquid crystals 1030, a liquid crystal alignment layer 1040, a common electrode 1045, a second substrate 1050, and a second polarizer 1055. An additional liquid crystal alignment layer is deposited over substrate 1010, pixel electrode PE_1, vertical risers V_R_0-V_R_1, base electrodes BaE_0 and BaE_1, and control electrodes CE_0 and CE_1. However to more clearly show the features of pixel 1000P, this liquid crystal alignment layer is not shown in FIGS. 10A-10B. Pixel 1000P is similar to Pixel 200 (FIGS. 2, 3A, 3B) except that control electrode CE_1 is formed on a vertical riser V_R_1 and Base electrode BaE_0 is formed on vertical riser V_R_0. Pixel electrode PE_1 are formed on substrate 1010. Liquid crystals 1030 are located in between pixel electrode PE_1 and common electrode 1045 (more specifically, between liquid crystal alignment layer 1040 which is on the bottom of common electrode 1040 and the liquid crystal alignment layer over pixel electrode PE_1 that is not shown in FIGS. 10A-10B. Pixel electrode PE_1 is coupled to switching element SE_1 (not shown in FIGS. 10A-10B). Common electrode 1045 and base electrodes BaE_1 and BaE_2 are connected to a common voltage V_comm. Control electrode CE_1 is coupled to a control voltage signal V_ctrl.

The difference in voltage on base electrode BaE_1 and control electrode CE_1 amplifies an intrinsic fringe field around pixel electrode PE_1. Furthermore, the difference in voltage in control electrode CE_1 and pixel electrode PE_1 also amplifies the intrinsic fringe field around pixel electrode PE_1. The amplified intrinsic fringe field interacts with the pixel electrode electric field, when pixel electrode PE_1 is turned on (i.e. transmit light). The interaction of amplified intrinsic fringe field and the pixel electrode electric field causes the liquid crystals to tilt in the same direction.

Putting control electrode CE_1 and base electrode BaE_2 on vertical riser V_R_1 allows a lower voltage to be used for control voltage V_ctrl as compared to pixel 200. For example, the active voltage of control voltage V_ctrl can be the same as the pixel ON voltage V_p_on for pixel electrode PE_1. Thus, in many embodiments of the present invention control electrode CE_1 is coupled to switching element SE_1, which is also connected to pixel electrode PE_1. Generally, the vertical distance between pixel electrode PE_1 and common electrode 1045 (i.e. the large gap distance) should be at least 1.2 times the vertical distance between control electrode CE_1 on vertical riser V_R_1 and common electrode 1045 (i.e. the small gap distance). Thus, the large gap distance should be at least one and a fifth times the small gap distance. In a particular embodiment of the present invention, the large gap is 3 micrometers and the small gap is 2 micrometer. Thus, in this embodiment, the large gap distance is 1.5 times the small gap distance. However, in another embodiment of the present invention, the small gap is only 1 micrometer.

In FIG. 10A, pixel 1000P is in the pixel OFF state. The voltage on pixel electrode PE_1 is nearly the same as common voltage V_comm. Therefore, there is practically no electric field between common electrode 1045 and pixel electrode PE_1. Accordingly, liquid crystals 1030 are in the initial vertical orientation without any pre-tilt angle position. However, some embodiments of the present invention include a small pretilt angle for the liquid crystal.

In FIG. 10B, pixel 1000P is in the pixel ON state. Switching element SE_1 (not shown) drives pixel electrode PE_1 to a pixel ON voltage V_p_on. Accordingly, a pixel electrode electric field develops between common electrode 1045 (at common voltage Vcomm) and pixel electrode PE_1. The amplified intrinsic fringe field interacts with the pixel electrode electric field to cause the liquid crystals tilt in the same direction. The tilted liquid crystals allow light to pass through display 1000. In displays where the liquid crystals should tilt left instead of right, the positions of the base electrodes and the control electrodes can be swapped. In some embodiments of the present invention, pixel electrode PE_1 has a width between 40 to 70 micrometers, and a depth between 40 to 70 micrometers.

Figure 11:
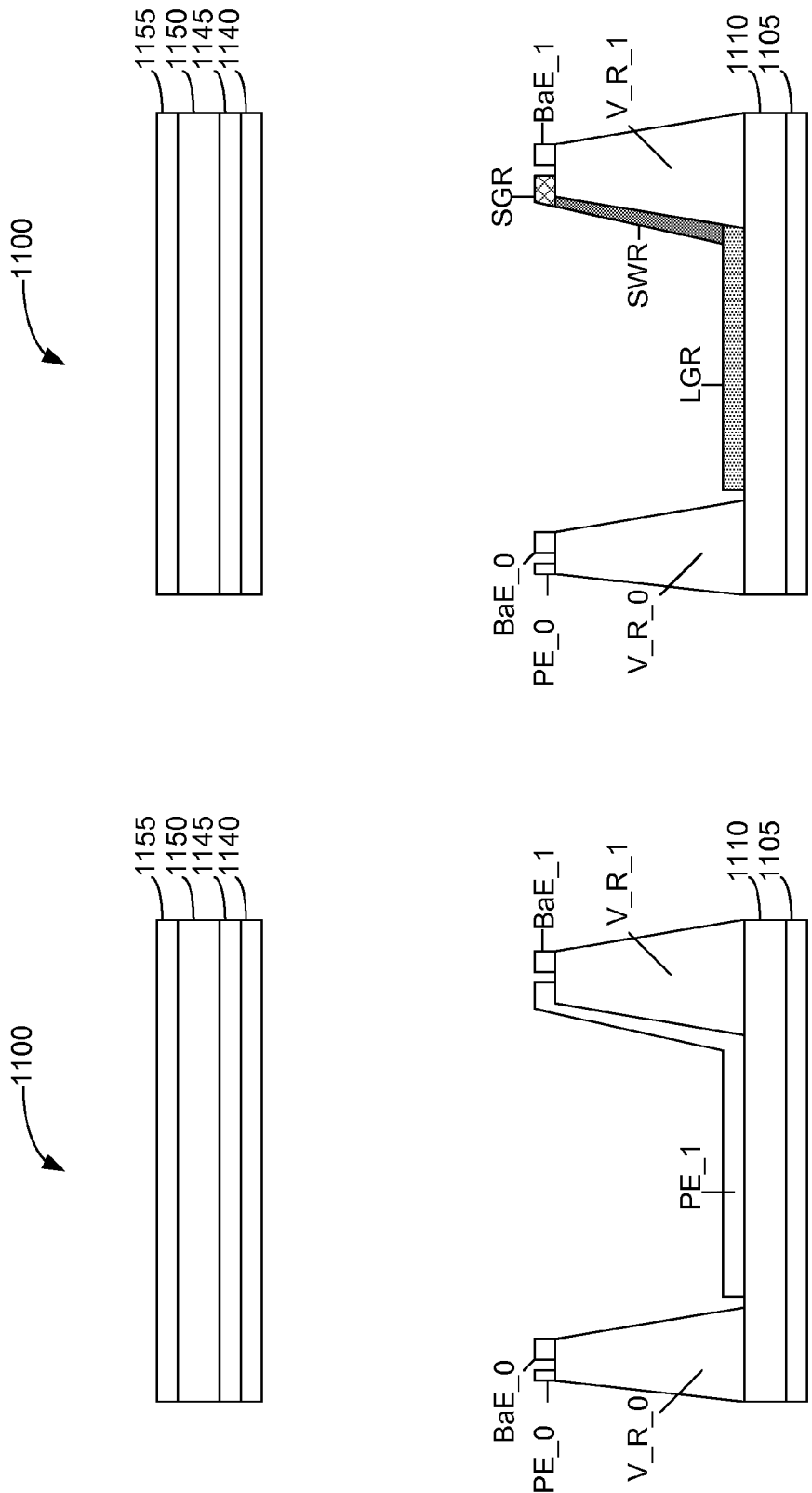
FIGS. 11A-11B illustrate a liquid crystal display in accordance with one embodiment of the present invention.

Just as with pixel 200, pixel 1000P can be modified by replacing pixel electrode PE_1 with a segmented pixel electrode. Similarly, pixels 500, 600, 700, 800 and 900 can be modified to include vertical risers to lift the control electrodes and appropriate base electrodes. As explained above, when the control electrode is on a vertical riser the control electrode can be coupled to the same switching element that controls the pixel electrode. Therefore, in some embodiments of the present invention, rather than forming separate pixel electrodes and control electrodes, the control electrode is eliminated and the pixel electrode is extended to be formed over the substrate and part of the vertical riser. FIG. 11A shows a display 1100 using a pixel 1100P (not labeled in FIG. 11A) that includes such a pixel electrode. Display 1100 includes a first polarizer 1105, a first substrate 1110, pixel 1100P (having base electrode BaE_1, pixel electrode PE_1, and vertical riser V_R_1), a liquid crystal alignment layer 1140, a common electrode 1145, a second substrate 1150, and a second polarizer 1155. A portion of a pixel to the left of pixel 1100P is also shown in FIG. 11A-11B. Specifically, a small portion of pixel electrode PE_0, base electrode BaE_0 is shown on top of vertical riser V_R_0. An additional liquid crystal alignment layer is deposited over substrate 1110, pixel electrodes PE_0 and PE_1, vertical risers V_R_0 and V_R_1, base electrodes BaE_0 and BaE_1. However to more clearly show the features of pixel 1100P, this liquid crystal alignment layer is not shown in FIGS. 11A-11B. In addition for clarity, the liquid crystals are not shown in FIGS. 11A-11B. Base electrode BaE_1 is formed on top of vertical riser V_R_1. Pixel electrode PE_1 is formed on top of substrate 1110, the sidewall of vertical riser V_R_1, and the top of vertical riser V_R_1. For clarity, pixel electrode PE_1 of pixel 1100P is described as having a large gap region LGR, a sidewall region SWR, and a small gap region SGR. FIG. 11B shows the three regions of pixel electrode PE_1 with different shading. Large gap region LGR of pixel electrode PE_1 is the portion of pixel electrode PE_1 having the largest gap to common electrode 1145, i.e. greatest distance to common electrode 1145. Thus, large gap region LGR of pixel electrode PE_1 is on substrate 1110. Sidewall region SWR of pixel electrode, is the portion of pixel electrode PE_1 formed on the side wall of vertical riser V_R_1. Small gap region SGR of pixel electrode PE_1 is the portion of pixel electrode PE_1 having the smallest gap to common electrode 1145, i.e. smallest distance to common electrode 1145. Thus, small gap region SGR of pixel electrode PE_1 is on top of vertical riser V_R_1. Pixel electrode PE_1 is coupled to switching element SE_1 (not shown in FIGS. 11A-11B). Common electrode 1145 and base electrodes BaE_0 and BaE_1 are connected to a common voltage V_comm. Some embodiments of the present invention omits the base electrodes.

When pixel 1100P is in the pixel ON state, i.e. switching element SE_1 is driving pixel electrode to pixel ON voltage V_p_on, both small gap region SGR of pixel electrode PE_1 and sidewall region SWR of pixel electrode PE_1 amplifies the intrinsic fringe field around pixel electrode PE_1. The amplified intrinsic fringe field interacts with the pixel electrode electric field. The interaction of amplified intrinsic fringe field and the pixel electrode electric field causes the liquid crystals to tilt in the same direction. Generally, the vertical distance between large gap region LGR of pixel electrode PE_1 and common electrode 1045 (i.e. the large gap distance) should be at least 1.2 times the vertical distance between small gap region SGR of pixel electrode PE_1 on vertical riser V_R_1 and common electrode 1045 (i.e. the small gap distance). Thus, the large gap distance should be at least one and a fifth times the small gap distance. In a particular embodiment of the present invention, the large gap distance is 3 micrometers and the small gap distance is 2 micrometer. Thus, in this embodiment, the large gap distance is 1.5 times the small gap distance. In another embodiment of the present invention, the small gap distance is 0.75 micrometers. Thus, in this embodiment, the large gap distance is four times the small gap distance. Generally, when the large gap distance gets higher than six times the small gap distance, the fringe field amplification may be less effective.

In many embodiments of the present invention, all regions of pixel electrode PE_1 are formed together using the same material, typically a transparent conducting material such as indium tin oxide (ITO) is used. Generally, the surfaces of pixel electrode PE_1 including the small gap regions are smooth. In most embodiment of the present invention, the large gap region of pixel electrode PE_1 is used to transmit light through the display, while the sidewall region and small gap region mainly provide fringe field amplification. Thus, the large gap region is larger than the sidewall region and small gap region. Generally, the large gap region is at least twice as large as the small gap region. For example, in many embodiments of the present invention, the horizontal width of the large gap region is 20 to 80 micrometers, the horizontal width of the sidewall region is 2 to 10 micrometers, and the horizontal width of the small gap region is 2 to 10 micrometers. In a specific embodiment of the present invention the horizontal width of the large gap region is 40 micrometers, the horizontal width of the sidewall region is 2 micrometers, and the horizontal width of the small gap region 5 micrometers. Because in many embodiments of the present invention, the sidewall region and small gap regions of pixel electrode PE_1 are used to amplify fringe fields rather than for light transmission, these embodiments may use a black matrix or other non-transparent material to prevent light leakage through the sidewall region and/or small gap regions.

In some embodiments of the present invention, sidewall region SWR of pixel electrode PE_1, provides enough amplification of the intrinsic fringe field, that small gap region SGR of pixel electrode PE_1 can be omitted.

Pixel 1100P can be easily modified to use segmented pixel electrodes. In general, segmented pixel electrodes have a plurality of pixel electrode segments in a first direction and a transverse pixel electrode segment in a second direction that connects the plurality of pixel electrode segments. For example, in FIG. 4. the plurality of pixel electrodes segments in the first direction are horizontal pixel electrode segments HPES_01-HPES_08 and the transverse pixel electrode segment is longitudinal pixel segment LPES_01. For greater amplification of the fringe field, the transverse pixel electrode segment should be in the small gap region of the segmented pixel electrode. However, many embodiments of the present invention locates the transverse pixel electrode segment in the large gap region of the pixel electrode.

Figure 12:
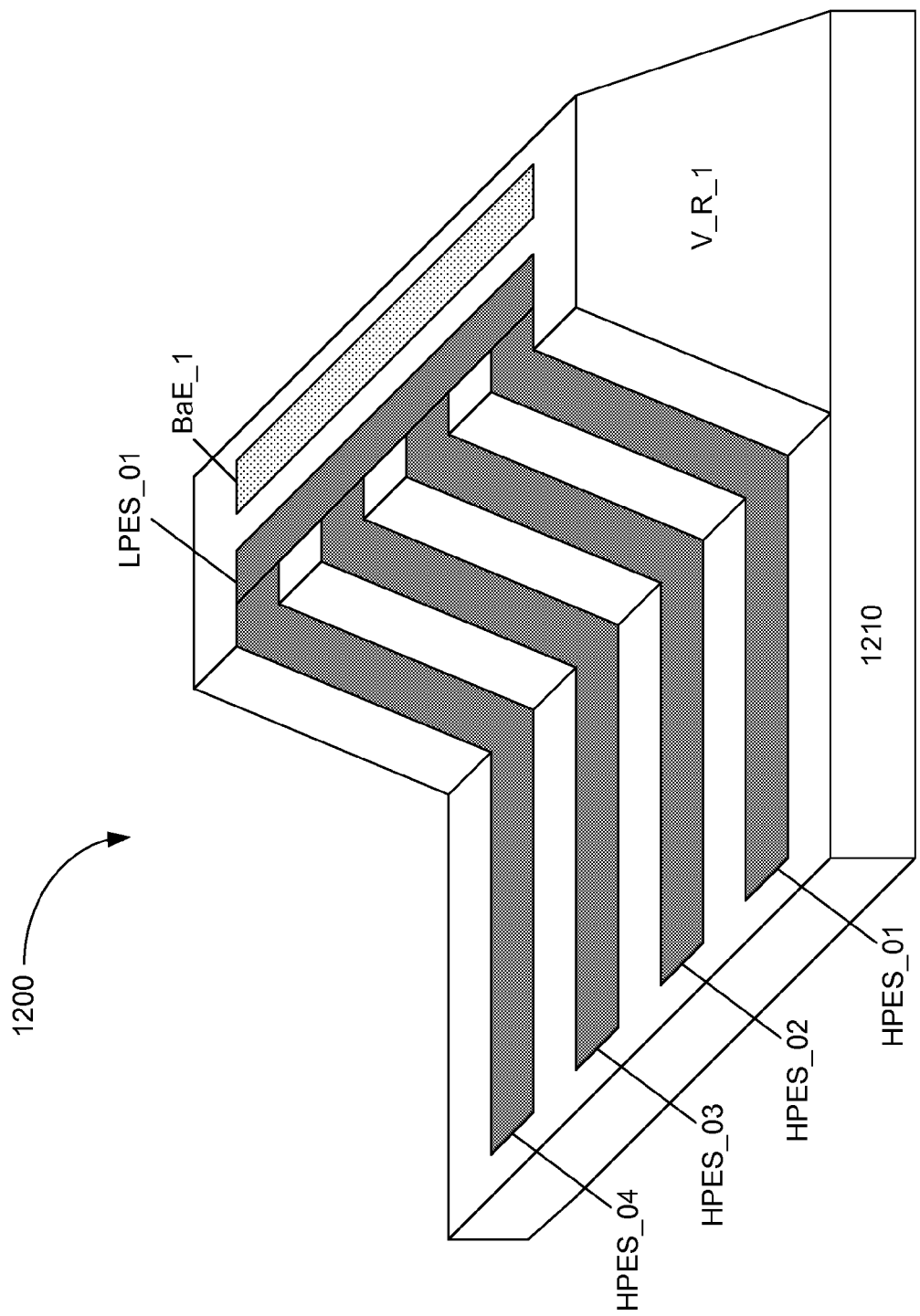
FIG. 12 is a perspective view of a portion of a pixel of a liquid crystal display in accordance with one embodiment of the present invention.

FIG. 12 shows a perspective view of a portion of a pixel 1200 on a substrate 1210 using a segmented pixel electrode SPE_1 (not specifically labeled in FIG. 12). Pixel 1200 includes a vertical riser V_R_1, a base electrode BaE_1, segmented pixel electrode SPE_1, which has four horizontal pixel electrode segments HPES_01 to HPES_04, and a longitudinal pixel electrode segment LPES_01. Horizontal pixel electrode segments HPES_01 to HPES_04 are formed on substrate 1210, the sidewall of vertical riser V_R_1 and the top of vertical riser V_R_1. Thus, each of the horizontal pixel electrode segment has a large gap segment region over substrate 1210, a sidewall segment region over the sidewall of vertical riser V_R_1, and a small gap segment region on top of vertical riser V_R_1. Longitudinal pixel electrode segment LPES_01 is formed on top of vertical riser V_R_1 and connects horizontal pixel electrode segments HPES_01 to HPES_04. Base electrode BaE_1 is also formed on top of vertical riser V_R_1. As explained above, the portions of segmented pixel electrode SPE_1 on the sidewall vertical riser V_R_1 and on top of vertical riser V_R_1 amplifies the intrinsic fringe fields of horizontal pixel electrode segments HPES_01 to HPES_04.

Figure 13:
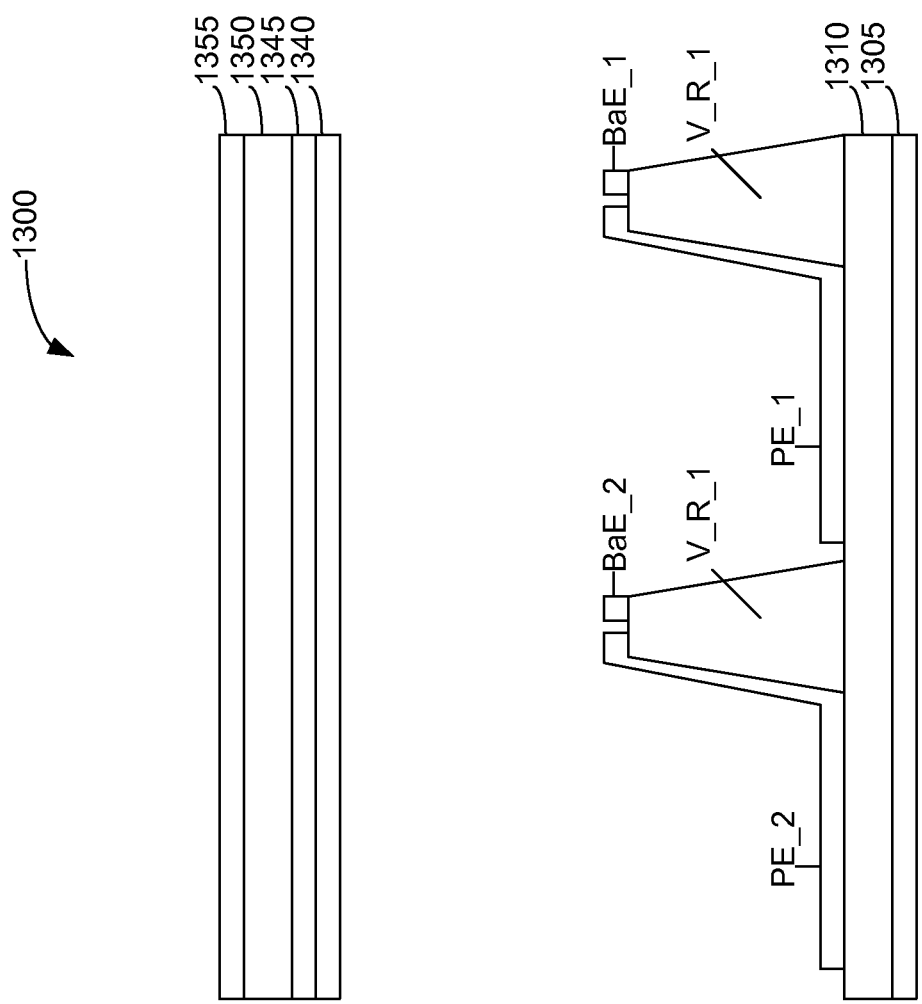
FIG. 13 illustrates a liquid crystal display in accordance with one embodiment of the present invention.

FIG. 13 shows a display 1300 with a pixel 1300P (not specifically labeled in FIG. 13) that uses the two pixel electrodes, each having a large gap region, a sidewall region, and a small gap region. Display 1300 includes a first polarizer 1305, a first substrate 1310, pixel 1300P (having base electrodes BaE_1 and BaE_2, pixel electrodes PE_1 and PE_2, and vertical risers V_R_1 and V_R_2), a liquid crystal alignment layer 1340, a common electrode 1345, a second substrate 1350, and a second polarizer 1355. An additional liquid crystal alignment layer is deposited over substrate 1310, pixel electrodes PE_0 and PE_1, vertical risers V_R_1 and V_R_2, base electrodes BaE_1 and BaE_2. However to more clearly show the features of pixel 1300P, this liquid crystal alignment layer is not shown in FIG. 13. In addition for clarity, the liquid crystals are not shown in FIG. 13. Base electrode BaE_1 is formed on top of vertical riser V_R_1. Pixel electrode PE_1 is formed on substrate 1310, the sidewall of vertical riser V_R_1, and the top of vertical riser V_R_1. For clarity, pixel electrode PE_1 of pixel 1300P is described as having a large gap region LGR, a sidewall region SWR, and a small gap region SGR. These regions while not labeled in FIG. 13 are basically the same as shown in FIG. 11B for pixel 1100P. Large gap region LGR of pixel electrode PE_1 is on substrate 1310. Sidewall region SWR of pixel electrode PE_1, is formed on the side wall of vertical riser V_R_1. Small gap region SGR of pixel electrode PE_1 is formed on top of vertical riser V_R_1. Vertical riser V_R_2 is to the left of pixel electrode PE_1. Base electrode BaE_2 is formed on top of vertical riser V_R_2. Pixel electrode PE_2 is formed on substrate 1310, the sidewall of vertical riser V_R_2, and the top of vertical riser V_R_2. Specifically, large gap region LGR of pixel electrode PE_2 is on substrate 1310. Sidewall region SWR of pixel electrode PE_2, is formed on the side wall of vertical riser V_R_2. Small gap region SGR of pixel electrode PE_2 is formed on top of vertical riser V_R_2.

Pixel electrodes PE_1 and PE_2 are coupled to switching element SE_1 (not shown in FIG. 13). Common electrode 1145 and base electrodes BaE_1 and BaE_2 are connected to a common voltage V_comm. When pixel 1300P is in the pixel ON state, i.e. switching element SE_1 is driving pixel electrodes PE_1 and PE_2 to pixel ON voltage V_p_on, both small gap region SGR of pixel electrode PE_1 and sidewall region SWR of pixel electrode PE_1 amplifies the intrinsic fringe field around pixel electrode PE_1. Similarly, both small gap region SGR of pixel electrode PE_2 and sidewall region SWR of pixel electrode PE_2 amplifies the intrinsic fringe field around pixel electrode PE_2. The amplified intrinsic fringe field interacts with the pixel electrode electric field. The interaction of amplified intrinsic fringe field and the pixel electrode electric field causes the liquid crystals to tilt in the same direction. Pixel 1300P can be easily modified to use segmented pixel electrodes. In addition, pixel 1300P can be modified to include additional pixel electrodes.

Figure 14:
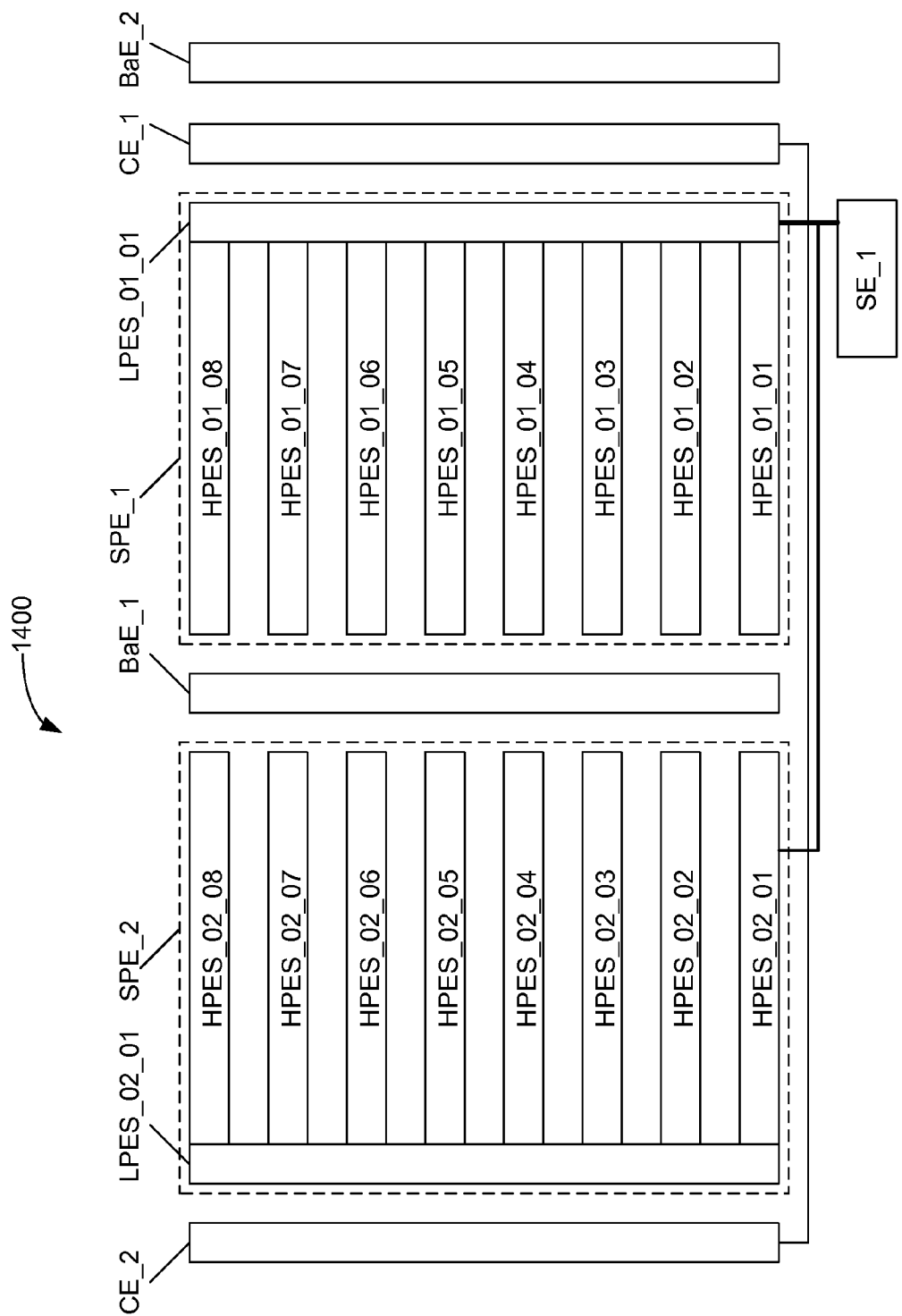
FIG. 14 illustrates a pixel of a liquid crystal display in accordance with one embodiment of the present invention.

As explained above, Conventional vertically aligned LCDS having pixels with multiple liquid crystal domains are expensive and complicated to because the liquid crystals in different domains have to have pre-tilt angles in different directions. However, using the principles of the present invention, LCDs with pixels having multiple liquid crystal domains can made more cheaply because no pre-tilt angle is required for the pixels of the present invention. FIG. 14, shows a pixel 1400 having two liquid crystal domains. Pixel 1400 includes a first base electrode BaE_1, a second base electrode BaE_2, a first segmented pixel electrode SPE_1, a second segmented pixel electrode SPE_2, a first control electrode CE_1, a second control electrode CE_2, and a switching element SE_1. Segmented pixel electrode SPE_1 is located between first base electrode BAE_1 and control electrode CE_1. Specifically, base electrode BaE_1 is on a first side (i.e. the left side in FIG. 14) of segmented pixel electrode SPE_1 and separated from segmented pixel electrode SPE_1, by a horizontal base electrode separation HBaES1 (not labeled in FIG. 14). Control electrode CE_1 is on a second, or opposite side (i.e. the right side in FIG. 14) of segmented pixel electrode SPE_1 and separated from segmented pixel electrode SPE_1 by a horizontal control electrode separation HCES1 (not labeled in FIG. 14). Base electrode BaE_2 is on the opposite side of control electrode CE_1 as compared to segmented pixel electrode SPE_1 and is separated from control electrode CE_1 by a horizontal control electrode separation HCES2 (not labeled in FIG. 14). Segmented pixel electrode SPE_2 is located to the left of base electrode BaE_1, and separated from base electrode BaE_1 by a horizontal base electrode spacing HBaES3 (not labeled in FIG. 14). Segmented pixel electrode SPE_2 is located between base electrode BaE_1 and control electrode CE_2. Specifically, control electrode CE_2 is on a first side (i.e. the left side in FIG. 14) of segmented pixel electrode SPE_2 and separated from segmented pixel electrode SPE_2, by a horizontal base electrode separation HBaES2 (not labeled in FIG. 14). Base electrode BaE_1 is on a second, or opposite side (i.e. the right side in FIG. 14) of segmented pixel electrode SPE_2 and separated from segmented pixel electrode SPE_2 by a horizontal control electrode separation HCES4 (not labeled in FIG. 14). Switching element SE_1 is coupled to segmented pixel electrode SPE_1 and segmented pixel electrode SPE_2 and control whether pixel 600 is configured to the pixel ON state (transmits light) or the pixel OFF state (blocks light). Control electrodes CE_1 and CE_2 are coupled to control voltage signal V_ctrl and base electrodes BaE_1 and BaE_2 are coupled to common voltage V_comm.

Segmented pixel SPE_1 of pixel 1400 has a plurality of horizontal pixel electrode segments HPES_01_01, HPES_01_02, . . . HPES_01_08 and a longitudinal pixel electrode segment LPES_01_01. In pixel 1400, longitudinal pixel electrode segment LPES_01_01 forms the right side of segmented pixel electrode SPE_1. Horizontal pixel electrode segments HPES_01_01-HPES_01_08 extend from the left side of segmented pixel electrode SPE_1 to longitudinal pixel electrode segment LPES_01_01. Similarly, segmented pixel SPE_2 of pixel 1400 has a plurality of horizontal pixel electrode segments HPES_02_01, HPES_02_02, . . . HPES_02_08 and a longitudinal pixel electrode segment LPES_02_01. However, in pixel 1400, longitudinal pixel electrode segment LPES_02_01 forms the left side of segmented pixel electrode SPE_2. Horizontal pixel electrode segments HPES_02_01-HPES_02_08 extend from the right side of segmented pixel electrode SPE_2 to longitudinal pixel electrode segment LPES_02_01. Pixel 1400 can be made longer by including more horizontal pixel electrode segments in segmented pixels SPE_1 and SPE_2.

Control electrodes CE_01 of pixel 1400 is on the right side of segmented pixel electrode SPE_1. Consequently, the difference in voltage between control electrode CE_1 and segmented pixel electrode SPE_1 amplifies the intrinsic fringe fields of horizontal pixel electrode segments HPES_01_01 to HPES_01_08. The amplified intrinsic fringe field interacts with the pixel electrode electric field of segmented pixel electrode SPE_1 and cause the liquid crystals above segmented pixel electrode SPE_1 to tilt to the right. Conversely, Control electrodes CE_02 of pixel 1400 is on the left side of segmented pixel electrode SPE_2. Consequently, the difference in voltage between control electrode CE_1 and segmented pixel electrode SPE_2 amplifies the intrinsic fringe fields of horizontal pixel electrode segments HPES_02_01 to HPES_02_08. The amplified intrinsic fringe field interacts with the pixel electrode electric field of segmented pixel electrode SPE_2 and cause the liquid crystals above segmented pixel electrode SPE_2 to tilt to the left. Thus pixel 1400 has two liquid crystal domains.

Figure 15:
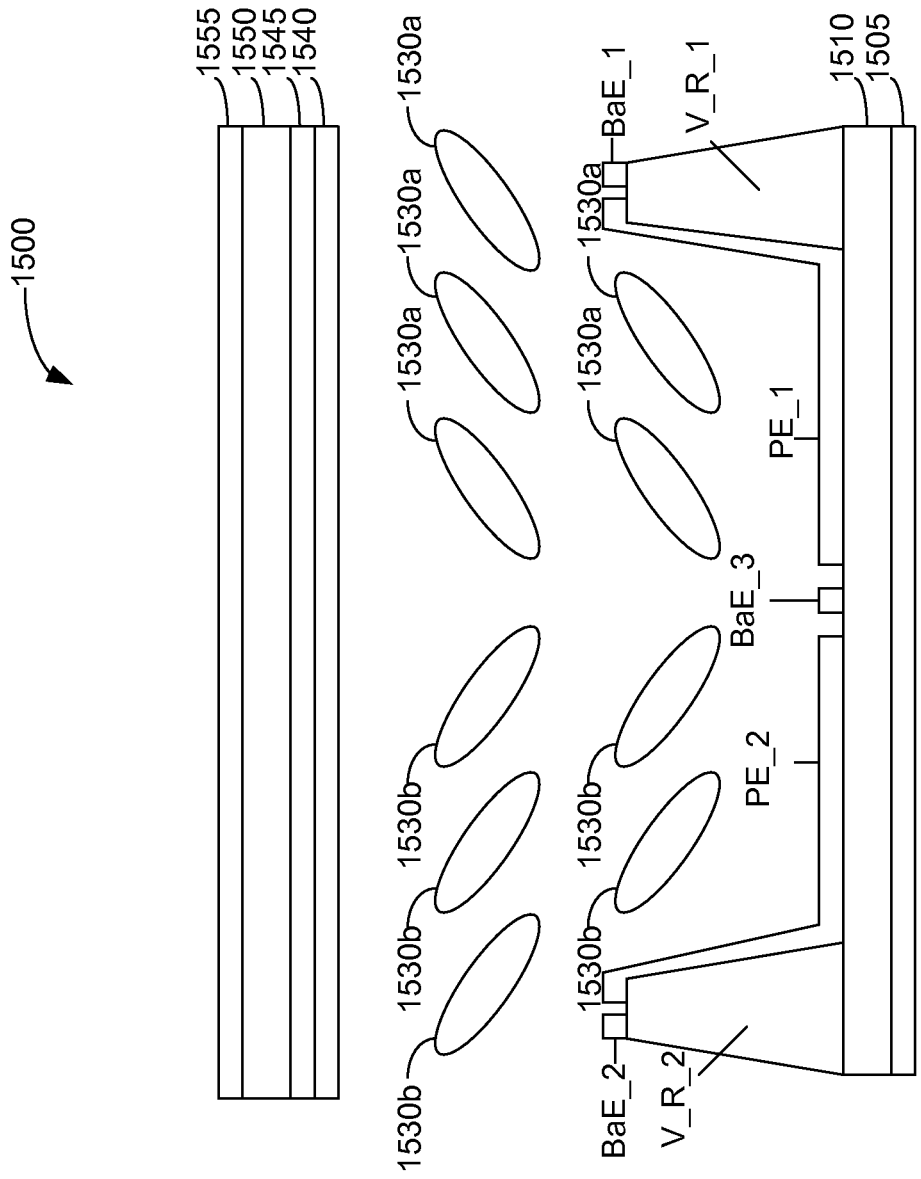
FIG. 15 illustrates a liquid crystal display in accordance with one embodiment of the present invention.

FIG. 15 shows a display 1500 with a pixel 1500P (not specifically labeled in FIG. 15) that uses the two pixel electrodes, each having a large gap region, a sidewall region, and a small gap region, to create two liquid crystal domains. Display 1500 includes a first polarizer 1505, a first substrate 1510, pixel 1500P (having base electrodes BaE_1, BaE_2 and BAE_3, pixel electrodes PE_1 and PE_2, and vertical risers V_R_1 and V_R_2), a liquid crystal alignment layer 1540, a common electrode 1545, a second substrate 1550, and a second polarizer 1555. An additional liquid crystal alignment layer is deposited over substrate 1510, pixel electrodes PE_0 and PE_1, vertical risers V_R_1 and V_R_2, base electrodes BaE_1, BaE_2, and BAE_3. However to more clearly show the features of pixel 1500P, this liquid crystal alignment layer is not shown in FIG. 15. In FIG. 15, pixel 1500P is drawn in the ON state, thus liquid crystals 1530a and 1530b are shown to be tilted. Specifically, liquid crystals 1530a over pixel element PE_1 are tilted to the right and liquid crystals 1530b over pixel element PE_2 are tilted to the left. The reasons of the tilting of the liquid crystals is explained below.

Base electrode BaE_1 is formed on top of vertical riser V_R_1. Pixel electrode PE_1 is formed on substrate 1510, the sidewall of vertical riser V_R_1, and the top of vertical riser V_R_1. For clarity, pixel electrode PE_1 of pixel 1500P is described as having a large gap region LGR, a sidewall region SWR, and a small gap region SGR. These regions while not labeled in FIG. 15 are basically the same as shown in FIG. 11B for pixel 1100P. Large gap region LGR of pixel electrode PE_1 is on substrate 1510. Sidewall region SWR of pixel electrode PE_1 is formed on the left side wall of vertical riser V_R_1. Small gap region SGR of pixel electrode PE_1 is formed on top of vertical riser V_R_1. Base electrode BaE_3 is to the left of pixel electrode PE_1 and in between pixel electrode PE_1 and pixel electrode PE_2. Vertical riser V_R_2 is to the left of pixel electrode PE_2. Base electrode BaE_2 is formed on top of vertical riser V_R_2. Pixel electrode PE_2 is formed on substrate 1510, the right sidewall of vertical riser V_R_2, and the top of vertical riser V_R_2. Specifically, large gap region LGR of pixel electrode PE_2 is on substrate 1510. Sidewall region SWR of pixel electrode PE_2 is formed on the right side wall of vertical riser V_R_2. Small gap region SGR of pixel electrode PE_2 is formed on top of vertical riser V_R_2. Base electrode BAE_3 serves to isolate the pixel electrode electric field of pixel electrode PE_1 and the pixel electrode electric field of pixel electrode PE_2.

Pixel electrodes PE_1 and PE_2 are coupled to switching element SE_1 (not shown in FIG. 15). Common electrode 1145 and base electrodes BaE_1 and BaE_2 are connected to a common voltage V_comm. When pixel 1500P is in the pixel ON state, i.e. switching element SE_1 is driving pixel electrodes PE_1 and PE_2 to pixel ON voltage V_p_on, both small gap region SGR of pixel electrode PE_1 and sidewall region SWR of pixel electrode PE_1 amplifies the intrinsic fringe field around pixel electrode PE_1. The amplified intrinsic fringe field interacts with the pixel electrode electric field. The interaction of amplified intrinsic fringe field and the pixel electrode electric field causes liquid crystals 1530a to tilt to the right. Similarly, both small gap region SGR of pixel electrode PE_2 and sidewall region SWR of pixel electrode PE_2 amplifies the intrinsic fringe field around pixel electrode PE_2. However, the interaction of amplified intrinsic fringe field and the pixel electrode electric field causes liquid crystals 1530b to tilt to the left. Thus, pixel 1500P has two liquid crystal domains. Pixel 1500P can be easily modified to use segmented pixel electrodes.

Figure 16:
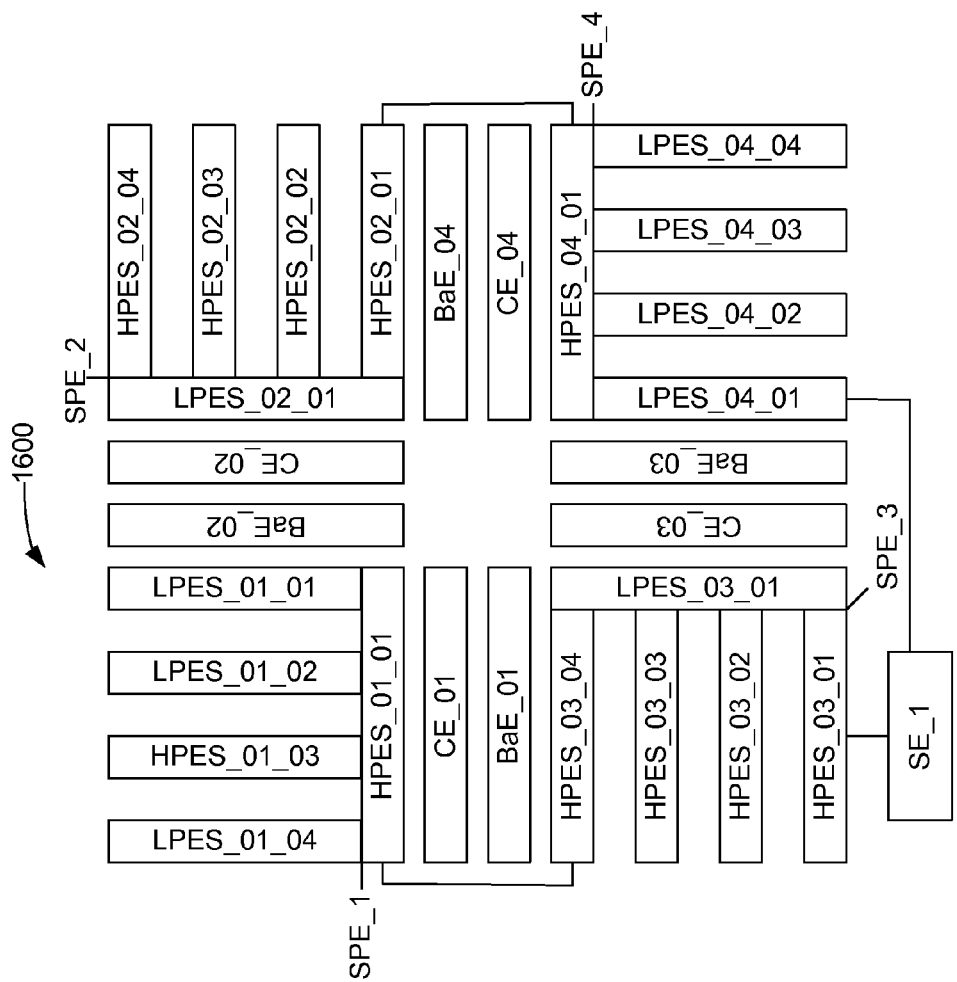
FIG. 16 illustrates a pixel of a liquid crystal display in accordance with one embodiment of the present invention.

FIG. 16 shows a pixel 1600 having four liquid crystal domains in accordance with one embodiment of the present invention. Pixel 1600 includes, segmented pixel electrodes SPE_1, SPE_2, SPE_3, and SPE_4, base electrodes BaE_01, BaE_02, BaE_03, and BaE_04, control electrodes CE_01, CE_02, CE_03, and CE_04, and a switching element SE_1. Switching element SE_1 is coupled to segmented pixel electrodes SPE_1, SPE_2, SPE_3 and SPE_4. Control electrodes CE_01, CE_02, CE_03, and CE_04 are coupled to control voltage signal V_ctrl. Base electrodes BaE_01, BaE_02, BaE_03, and BaE_04 are coupled to common voltage V_comm.

Segmented pixel electrode SPE_1 is located in the back left corner of pixel 1600. Segmented electrode, SPE_1 has four longitudinal pixel electrode segments LPES_01_01, LPES_01_02, LPES_01_03 and LPES_01_04 and a horizontal pixel electrode segment HPES_01_01 that connects longitudinal pixel electrode segments LPES_01_01, LPES_01_02, LPES_01_03 and LPES_01_04. Control electrode CE_01 is located in front of segmented pixel electrode SPE_1. Base electrode BaE_01 is located in front of control electrode CE_01 and in back of (i.e. behind) segmented pixel electrode SPE_3. When pixel 1600 is in the ON state, the voltage difference on control electrode CE_01 and segmented pixel electrode SPE_1 amplifies the intrinsic fringe field of segmented pixel electrode SPE_1. The interaction of the fringe field and the pixel electrode electric field of segmented pixel electrode SPE_1 cause the liquid crystals over segmented pixel electrode SPE_1 to tilt towards the front edge of the display, thus forming a first liquid crystal domain. Base electrode BaE_01 serves to isolate the electric fields of segmented pixel electrode SPE_3 from control electrode CE_01.

Segmented pixel electrode SPE_2 is located in the back right corner of pixel 1600. Segmented electrode, SPE_2 has four horizontal pixel electrode segments HPES_02_01, HPES_02_02, HPES_02_03 and HPES_02_04 and a longitudinal pixel electrode segment LPES_02_01 that connects horizontal pixel electrode segments HPES_02_01, HPES_02_02, HPES_02_03 and HPES_02_04. Control electrode CE_02 is located to the left of segmented pixel electrode SPE_2. Base electrode BaE_02 is located to the left of control electrode CE_02 and to the right of segmented pixel electrode SPE_1. When pixel 1600 is in the ON state, the voltage difference on control electrode CE_02 and segmented pixel electrode SPE_2 amplifies the intrinsic fringe field of segmented pixel electrode SPE_2. The interaction of the fringe field and the pixel electrode electric field of segmented pixel electrode SPE_2 cause the liquid crystals over segmented pixel electrode SPE_2 to tilt to the left, thus forming a second liquid crystal domain. Base electrode BaE_02 serves to isolate the electric fields of segmented pixel electrode SPE_1 from control electrode CE_02.

Segmented pixel electrode SPE_3 is located in the front left corner of pixel 1600. Segmented electrode, SPE_3 has four horizontal pixel electrode segments HPES_03_01, HPES_03_02, HPES_03_03 and HPES_03_04 and a longitudinal pixel electrode segment LPES_03_01 that connects horizontal pixel electrode segments HPES_03_01, HPES_03_02, HPES_03_03 and HPES_03_04. Control electrode CE_03 is located to the right of segmented pixel electrode SPE_3. Base electrode BaE_03 is located to the right of control electrode CE_03 and to the left of segmented pixel electrode SPE_4. When pixel 1600 is in the ON state, the voltage difference on control electrode CE_03 and segmented pixel electrode SPE_3 amplifies the intrinsic fringe field of segmented pixel electrode SPE_3. The interaction of the fringe field and the pixel electrode electric field of segmented pixel electrode SPE_3 cause the liquid crystals over segmented pixel electrode SPE_3 to tilt to the right, thus forming a third liquid crystal domain. Base electrode BaE_03 serves to isolate the electric fields of segmented pixel electrode SPE_4 from control electrode CE_03.

Segmented pixel electrode SPE_4 is located in the front right corner of pixel 1600. Segmented electrode, SPE_4 has four longitudinal pixel electrode segments LPES_04_01, LPES_04_02, LPES_04_03 and LPES_04_04 and a horizontal pixel electrode segment HPES_04_01 that connects longitudinal pixel electrode segments LPES_04_01, LPES_04_02, LPES_04_03 and LPES_04_04. Control electrode CE_04 is located in back of (i.e. behind) segmented pixel electrode SPE_4. Base electrode BaE_04 is located in back of control electrode CE_04 and in front of segmented pixel electrode SPE_2. When pixel 1600 is in the ON state, the voltage difference on control electrode CE_04 and segmented pixel electrode SPE_4 amplifies the intrinsic fringe field of segmented pixel electrode SPE_4. The interaction of the fringe field and the pixel electrode electric field of segmented pixel electrode SPE_4 cause the liquid crystals over segmented pixel electrode SPE_4 to tilt upwards (with respect to FIG. 16), thus forming a fourth liquid crystal domain. Base electrode BaE_02 serves to isolate the electric fields of segmented pixel electrode SPE_2 from control electrode CE_04. Accordingly, pixel 1600 has four liquid crystal domains.

In addition to creating pixels with multiple liquid crystal domains, the present invention can be used to create multi-sector displays. In a multi-sector display, the display is divided into multiple sectors, with each sector having pixels with the same liquid crystal domain. But different sectors are able to have different liquid crystal domains. FIG. 17, illustrates a multi-sector display 1700. Multi-sector display 1700 has a left display sector DS_L on the left side of multi-sector display 1700 and a right display sector DS_R on the right side of multi-sector display 1700. The pixels in left display sector DS_L have the same liquid crystal domain, e.g. a left tilt domain. However, pixels in right display sector DS_R would have a right-tilt domain. Other displays in accordance with the present invention can include additional sectors.

Some embodiments of the present invention use optical compensation films to increase the viewing angle of the display. For example, some embodiments of the present invention use negative birefringence optical compensation films with a vertical oriented optical axis on the top or bottom substrate or both top and bottom substrates to increase viewing angle. Other embodiments may use uniaxial optical compensation films or biaxial optical compensation films with a negative birefringence. In some embodiments, optical compensation films with a parallel optical axis orientation can add to the negative birefringence film with a vertical optical axis orientation. Furthermore, multiple films that include all combinations could be used. Other embodiments may use a circular polarizer to improve the optical transmission and viewing angle. Other embodiments may use a circular polarizer with the optical compensation films to further improve the optical transmission and viewing angle. Furthermore, some embodiments of the present invention use black matrix (BM) or non-transparent materials to cover the control voltage region or side wall region to prevent light leakage in the optical black state and make the control voltage or side wall region regions opaque. Use of the black matrix or non-transparent material improves the contrast ratio of the display and may provide better viewing angle and color performance.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiment described. For example, in view of this disclosure those skilled in the art can define other pixel definitions, pixel electrodes, control electrodes, base electrodes, large gap regions, small gap regions, vertical risers, side wall regions, segmented pixel electrodes, fringe fields, electrodes, substrates, display sectors, liquid crystal domains, films, and so forth, and use these alternative features to create a method or system according to the principles of this invention. Thus, the invention is limited only by the following claims.

What is claimed is:

1. A pixel of a display having a first substrate and a second substrate, the pixel comprising:
 a first pixel electrode above the first substrate;
 a common electrode below the second substrate;
 a plurality of liquid crystal between the common electrode and the pixel electrode;
 a switching element coupled to the pixel electrode;
 a first control electrode above the first substrate and on a first side of the first pixel electrode;
 wherein the first control electrode is configured to be at an active control voltage when the pixel is in an ON state and wherein the active control voltage is greater than an output voltage of the first switching element.

2. The pixel of claim 1, wherein the active control voltage is more than twice the output voltage of the first switching element.

3. The pixel of claim 1, wherein the first pixel electrode is a first segmented pixel electrode comprising a first plurality of pixel electrode segments extending in a first direction, wherein the first plurality of pixel electrode segments are electrically coupled.

4. The pixel of claim 3, wherein the first segmented pixel electrode further comprises a transverse pixel electrode segment extending in a second direction connecting the first plurality of pixel electrode segments.

5. The pixel of claim 1, further comprising, a first base electrode above the first substrate, wherein the first pixel electrode is between the first base electrode and the first control electrode and wherein the base electrode and the common electrode are coupled to a common voltage.

6. The pixel of claim 5, further comprising a second base electrode coupled to the common voltage, wherein the first control electrode is between the first pixel electrode and the second base electrode.

7. The pixel of claim 6, further comprising:
a second control electrode coupled to the first control electrode, wherein the first base electrode is between the second control electrode and the first pixel electrode; and
a second pixel electrode coupled to the first switching element, wherein the second control electrode is between the second pixel electrode and first base electrode.

8. The pixel of claim 7, wherein the first pixel electrode is a first segmented pixel electrode comprising a first plurality of first-pixel pixel electrode segments extending in a first direction, wherein the first plurality of first-pixel pixel electrode segments are electrically coupled; and wherein the second pixel electrode is a second segmented pixel electrode comprising a first plurality of second-pixel pixel electrode segments extending in the first direction, wherein the first plurality of second-pixel pixel electrode segments are electrically coupled.

9. The pixel of claim 8, wherein the first segmented pixel electrode further comprises a first-pixel transverse pixel electrode segment extending in a second direction and connecting the first plurality of first-pixel pixel electrode segments; and wherein the second segmented pixel electrode further comprises a second-pixel transverse pixel electrode segment extending in the second direction and connecting the first plurality of second-pixel pixel electrode segments.

10. The pixel of claim 7, further comprising a third base electrode coupled to common voltage, wherein the second pixel electrode is between the second control electrode and the third base electrode.

11. The pixel of claim 10, further comprising:
a third control electrode coupled to the second control electrode, wherein the second base electrode is between the second pixel electrode and the third control electrode; and
a third pixel electrode coupled to the first switching element, wherein the third control electrode is between the third pixel electrode and the second base electrode.

12. The pixel of claim 5, further comprising: a second pixel electrode coupled to the first switching element, wherein the first base electrode is between the second pixel electrode and first pixel electrode;
a second control electrode coupled to the first control electrode, wherein the second pixel electrode is between the second control electrode and first base electrode.

13. The pixel of claim 12, wherein the first pixel electrode is a first segmented pixel electrode comprising a first plurality of first-pixel pixel electrode segments extending in a first direction, wherein the first plurality of first-pixel pixel electrode segments are electrically coupled; and wherein the second pixel electrode is a second segmented pixel electrode comprising a first plurality of second-pixel pixel electrode segments extending in the first direction, wherein the first plurality of second-pixel pixel electrode segments are electrically coupled.

14. The pixel of claim 1 further comprising, a first base electrode above the first substrate, wherein the first control electrode is between the first base electrode and the first pixel electrode and wherein the base electrode and the common electrode are coupled to a common voltage.

15. The pixel of claim 14 further comprising a second pixel electrode coupled to the first switching element, wherein the first base electrode is between the first control electrode and the second pixel electrode and wherein the base electrode and the common electrode are coupled to a common voltage.

16. The pixel of claim 15, wherein the first pixel electrode is a first segmented pixel electrode comprising a first plurality of first-pixel pixel electrode segments extending in a first direction, wherein the first plurality of first-pixel pixel electrode segments are electrically coupled; and wherein the second pixel electrode is a second segmented pixel electrode comprising a first plurality of second-pixel pixel electrode segments extending in a second direction, wherein the first plurality of second-pixel pixel electrode segments are electrically coupled.

17. The pixel of claim 14, further comprising a second control electrode on a first side of the second pixel electrode, wherein the first base electrode is on a second side of the second pixel electrode and wherein the first side of the second pixel electrode extends along a first direction and the second side of the second pixel electrode extends along a second direction; and wherein the second control electrode is coupled to the first control electrode.

18. The pixel in claim 17, further comprising:
a second base electrode coupled to the common voltage, wherein the second control electrode is between the second pixel electrode and the second base electrode; and
a third pixel electrode coupled to the first switching element, wherein the second base electrode is between the second control electrode and the third pixel electrode.

19. The pixel of claim 18, further comprising a third control electrode, on a first side of the third pixel electrode, wherein the second base electrode is on a second side of the second pixel electrode and wherein the first side of the third pixel electrode extends along the second direction and the second side of the third pixel electrode extends along the first direction; and wherein the third control electrode is coupled to the first control electrode.

20. The pixel in claim 19, further comprising:
a third base electrode coupled to the common voltage, wherein the third control electrode is between the third pixel electrode and the third base electrode; and
a fourth pixel electrode coupled to the first switching element, wherein the third base electrode is between the third control electrode and the fourth pixel electrode.

21. The pixel of claim 20, further comprising a fourth control electrode on a first side of the fourth pixel electrode, wherein the third base electrode is on a second side of the fourth pixel electrode and wherein the first side of the fourth pixel electrode extends along the first direction and the second side of the fourth pixel electrode extends along the second direction, and wherein the fourth control electrode is coupled to the first control electrode.

22. The pixel of claim 1, further comprising a first vertical riser over the first substrate and wherein the first control electrode is formed over the top of the first vertical riser.

* * * * *